(12) United States Patent
Kameyama

(10) Patent No.: US 8,131,440 B2
(45) Date of Patent: Mar. 6, 2012

(54) VEHICLE CONTROL SYSTEM

(75) Inventor: Shogo Kameyama, Chiryu (JP)

(73) Assignee: Denso Corporation, Kariya (JP)

( * ) Notice: Subject to any disclaimer, the term of this patent is extended or adjusted under 35 U.S.C. 154(b) by 426 days.

(21) Appl. No.: 12/507,917

(22) Filed: Jul. 23, 2009

(65) Prior Publication Data

US 2010/0023234 A1 Jan. 28, 2010

(30) Foreign Application Priority Data

Jul. 23, 2008 (JP) ................................ 2008-190125

(51) Int. Cl.
*G08G 1/16* (2006.01)
(52) U.S. Cl. ............................... 701/70; 701/76; 701/77
(58) Field of Classification Search .............. 701/29–36, 701/70, 74, 75, 77, 78, 79; 340/431, 435, 340/439
See application file for complete search history.

(56) References Cited

U.S. PATENT DOCUMENTS

| | | | | |
|---|---|---|---|---|
| 6,292,753 | B1 * | 9/2001 | Sugimoto et al. ............. | 701/301 |
| 6,554,744 | B2 * | 4/2003 | Schmidt ........................ | 477/208 |
| 2008/0097677 | A1 | 4/2008 | Kawakami | |

FOREIGN PATENT DOCUMENTS

| | | |
|---|---|---|
| JP | 05-256170 | 10/1993 |
| JP | 6-144072 | 5/1994 |
| JP | 2000-255351 | 9/2000 |
| JP | 2000-291458 | 10/2000 |
| JP | 2002-015641 | 1/2002 |
| JP | 2002-059796 | 2/2002 |
| JP | 2002-269697 | 9/2002 |
| JP | 2004-042777 | 2/2004 |
| JP | 2004-168085 | 6/2004 |
| JP | 2004-280489 | 10/2004 |
| JP | 2005-009883 | 1/2005 |
| JP | 2005-085866 | 3/2005 |
| JP | 2005-090502 | 4/2005 |
| JP | 2005-153660 | 6/2005 |
| JP | 2007-198278 | 8/2007 |
| JP | 2008-004040 | 1/2008 |
| JP | 2008-95635 | 4/2008 |

OTHER PUBLICATIONS

Japanese Office Action dated Apr. 8, 2010, issued in corresponding Japanese Application No. 2008-190125, with English translation.

* cited by examiner

*Primary Examiner* — Richard M. Camby
(74) *Attorney, Agent, or Firm* — Nixon & Vanderhye PC

(57) ABSTRACT

An initial movement state of a vehicle is specified in which a starting-off or acceleration is enabled by stepping on an accelerator pedal. In the specified initial movement state, a starting-off direction of the vehicle and an obstacle existing in the starting-off direction are specified. In the initial movement state, an incorrect starting-off sign action is detected which a driver of the vehicle indicates in a duration prior to the time when the vehicle practically starts off. When the incorrect starting-off sign action is detected, an incorrect starting-off prevention output is performed.

11 Claims, 16 Drawing Sheets

| SHIFT P. | OBSTACLE EXISTENCE DIRECTION | | | |
|---|---|---|---|---|
| | FRONT | DANGER D. | BACK | DANGER D. |
| FRONT | PATTERN 1 | +1 | PATTERN 2 | 0 |
| BACK | PATTERN 5 | 0 | PATTERN 6 | +1 |

…

VEHICLE CONTROL SYSTEM

CROSS REFERENCE TO RELATED APPLICATION

The present application is based on and incorporates herein by reference Japanese Patent Application No. 2008-190125 filed on Jul. 23, 2008.

FIELD OF THE INVENTION

The invention relates to a vehicle control system.

BACKGROUND OF THE INVENTION

[Patent document 1] JP-2000-255351 A
[Patent document 2] JP-2002-269697 A
[Patent document 3] JP-2004-280489 A
[Patent document 4] JP-2005-90502 A
[Patent document 5] JP-2007-198278 A
[Patent document 6] JP-2004-168085 A
[Patent document 7] JP-2004-42777 A
[Patent document 8] JP-2002-59796 A
[Patent document 9] JP-2005-9883 A
[Patent document 10] JP-2002-15641 A
[Patent document 11] JP-2005-85866 A There is arising a trouble that the frontward gear or the backward gear of a vehicle is mistakenly operated owing to driver's inattention. Further, there is arising another trouble that detection of an obstacle is delayed by lapse of memory etc., to cause a confusion to mistakenly step on the accelerator pedal instead of the brake pedal. In order to prevent such troubles, a surrounding obstacle is detected at the time when the vehicle starts moving. When the detected distance to the obstacle is small, vehicle control systems carry out a starting-off suppression. Patent documents 1-5 describe such technologies.

The above-mentioned conventional configurations assume that incorrect starting-off preventive measures are naturally necessary to thereby study specific measures of how to suppress starting-off. In this regard, however, the conventional technology or configuration makes almost no consideration to the circumstantial analysis technique whether a measure is really required to prevent a danger. For instance, there may be a case that an obstacle exists around the vehicle and the distance to the obstacle is small. Even in such a case, a driver may intentionally start the movement of the vehicle for entering a garage, performing parallel parking, or moving sideward. An expert driver may not slow down the speed of the vehicle until the distance to the obstacle becomes significantly small. However, the above conventional technology except Patent document 2 automatically performs starting-off suppression and alarm process based on the relation between the distance to the obstacle and the starting-off direction, speed, or acceleration of the vehicle. Sufficient scene analysis is not conducted as to whether the measure to prevent incorrect starting-off is really necessary or as to whether the start is based on the driver's intention but not the incorrect driving operation. Naturally, in the case that the starting-off is based on the driver's intension, the starting-off suppression process and alarm process are executed redundantly in spite of not being incorrect starting-off actually. This poses a technical problem to rather provide a user with a troublesomeness.

In Patent document 2, a degree of a contact probability is calculated based on the direction and distance of an obstacle existing at a surrounding area. The driver's attention tendency is determined. The degree of the contact probability is amended further based on the determination result. It is noted that the attention tendency determination is based on the occurrence tendency analysis of the sudden acceleration or sudden deceleration after the driver cancels the mode of the starting-off suppression. After the vehicle action occurs which leads to the sudden acceleration or obstacle interference, a vehicle control is performed to avoid those. Such a vehicle control is long overdue. It is noted that on the scene in which a person and an obstacle exist especially in a range close to the vehicle, once sudden acceleration is performed, it is too late intrinsically. On the contrary, the sudden deceleration is a driving operation which the driver should perform essentially when an obstacle etc. is recognized. Even if the above determination is useful as a reference of incorrect starting-off prevention on the scene thereafter, it is not necessarily utilized for another control action against the incorrect starting-off prevention in the scene confronted now, etc.

Thus, the above conventional technologies can only one of the two methods as follows; (i) to extend the margin of danger prediction to thereby also include the scene which originally does not need incorrect starting-off preventive measures and frequently perform starting-off suppression process of low timeliness. (ii) On the contrary, to execute the starting-off suppression process as a stopgap measure after the vehicle driving operation of sudden acceleration etc. actually takes place. Either of the above-mentioned two methods is far from the originally desired control system, in which the incorrect starting-off preventive control be timely and properly executed in the truly needed scene.

SUMMARY OF THE INVENTION

It is an object to provide a vehicle control system to execute an incorrect starting-off preventive control timely and properly on a scene where a danger prevention is truly needed.

In order to solve the above problem, as an example of the present invention, a vehicle control system is provided as follows. An initial movement state is specified in which a speed of a vehicle is zero or minimal and a starting off or accelerating of the vehicle is allowed by stepping on an accelerator pedal. A starting-off direction of the vehicle in the initial movement state is specified. An obstacle which exists in the starting-off direction of the vehicle is specified. An incorrect starting-off sign action is detected which is predetermined as a sign of an incorrect starting-off towards the obstacle among actions of a driver of the vehicle in the initial movement state. An incorrect starting-off prevention output is performed for preventing the incorrect starting-off in conjunction with detecting the incorrect starting-off sign action.

BRIEF DESCRIPTION OF THE DRAWINGS

The above and other objects, features, and advantages of the present invention will become more apparent from the following detailed description made with reference to the accompanying drawings. In the drawings.

DETAILED DESCRIPTION OF THE PREFERRED EMBODIMENTS

Figure 1:
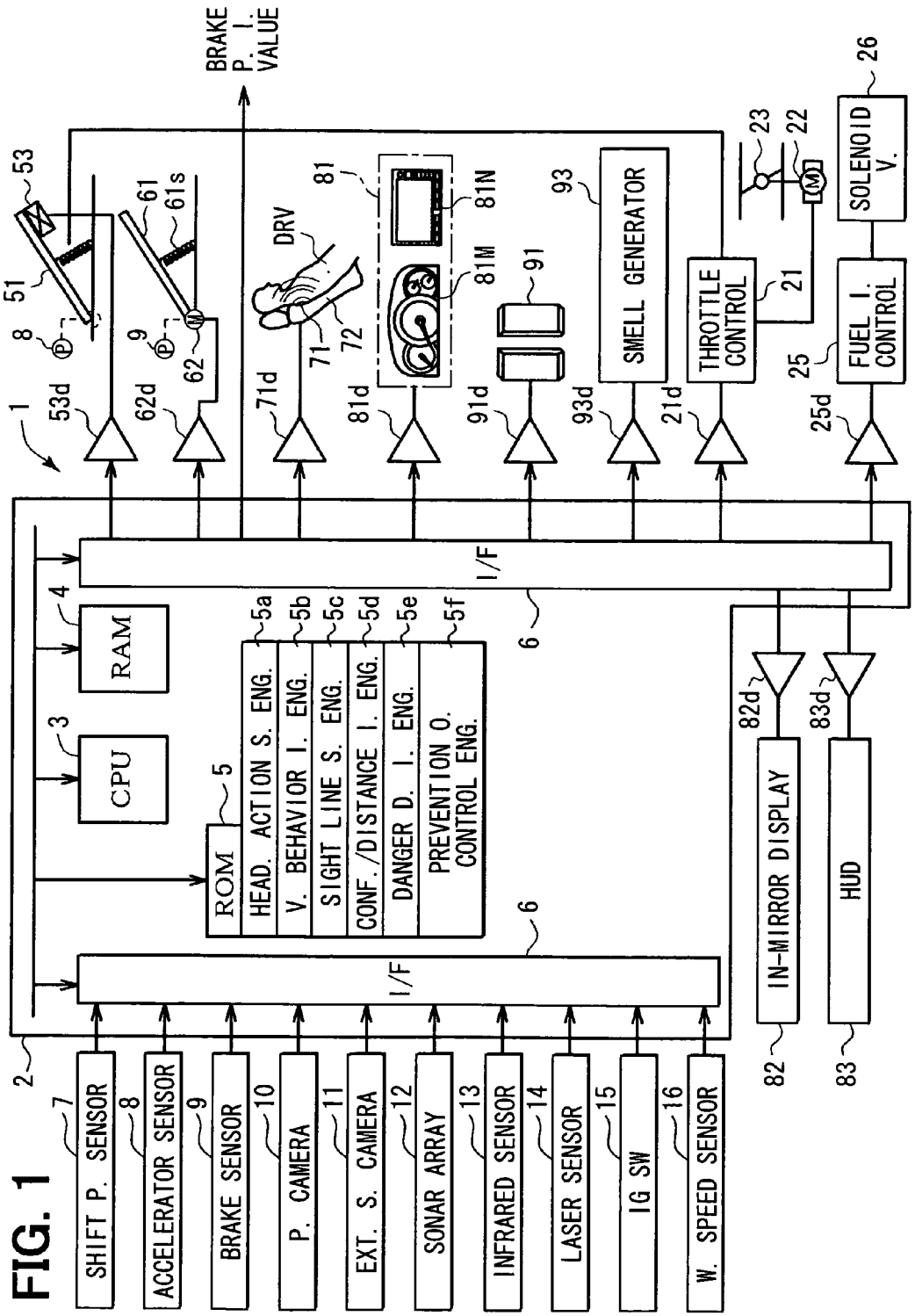
FIG. 1 is a block diagram illustrating an electrical configuration of a vehicle control system according to an embodiment of the present invention.

Embodiments of the present invention will be described in further detail with reference to the accompanying drawings. FIG. 1 is a block diagram showing an overall configuration of a vehicle control system according to an embodiment of the present invention. A main constituent for controlling the vehicle control system 1 is an ECU 2. The ECU 2 is configured of a microprocessor to which CPU 3, RAM 4, ROM 5, and I/O interface 6 is connected via an internal bus.

The I/O interface 6 is connected with the following: a shift position sensor 7 functioning as a starting-off direction specification means or shift position detection means; an accelerator sensor 8 which detects an amount of stepping on (an angle of stepping on) of an accelerator pedal 51; a brake sensor 9 which detects an amount of stepping on (an angle of stepping on) of a brake pedal 61; and a person camera 10 which captures an image of a driver who is seated in the driver's seat. In addition, to specify an existence direction and distance of an obstacle which exists in front or back of the vehicle, the following are also connected: an exterior stereo camera 11 which performs a three-dimensional image capture of an obstacle; an ultrasonic sonar array 12; an infrared sensor 13; and a laser sensor 14. In addition, an ignition (IG) switch 15 for detecting a vehicle engine start, and a wheel speed sensor (speed sensor) 16 are also connected. Furthermore, some of the above sensors may be connected to a second ECU communicatively connected with the ECU 2. Detection information of the above sensors may be obtained by the ECU 2 from the second ECU by communication.

The ROM 5 stores the various software engines which are included in a control program of the vehicle control system 1.

Heading direction specification engine 5a: to specify a starting-off direction of the vehicle ad based on a detection output of the shift position sensor 7 (configured of a contact switch switching in conjunction with a shift lever) (starting-off direction specification means).

Figures 6, 7:
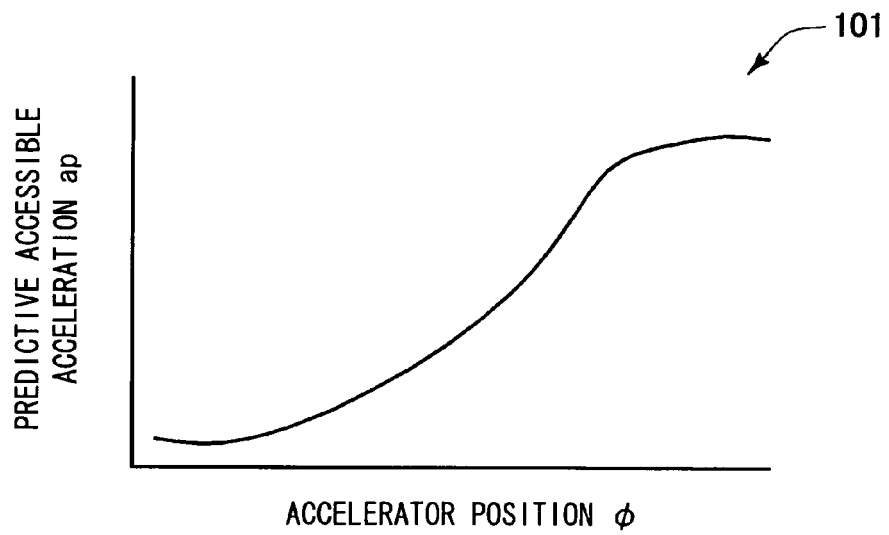
FIG. 6 is a diagram of an example of data illustrating a relationship between an accelerator position and a predicted accessible acceleration.
FIG. 7 is a schematic diagram illustrating a first example of a pattern table.

Vehicle action inference engine 5b: when the IG switch 15 is turned into an ON state, and the shift position is switched into the frontward position or the backward position from the parking position, an initial movement state of the vehicle is specified (initial movement state specification means). In addition, the relation between the amount of stepping on (accelerator position ϕ) of the accelerator pedal 51 and the accessible acceleration is previously designated by examinations, as illustrated in FIG. 6. Based on the relation, the accessible acceleration ap corresponding to the accelerator position ϕ detected by the accelerator sensor 8 is predicted.

Sight line specification engine 5c: to specify a sight line direction using a well-known algorithm from the driver's face capture image captured by the person camera 10 (sight line direction detection means). In detail, the engine can specify at least either (i) whether the sight line of a driver is directed to the front (at the time of moving frontward) or (ii) whether the sight line of the driver is directed to the back (at the time of moving backward). Furthermore, to respond to the case of confirming the back using a rearview mirror, it may be specified whether the sight line is directed to the rearview mirror. In the case of the vehicle carrying a back guide monitor system (and a back image capture camera), it may be specified whether the sight line is directed to the monitor display which displays an image in back of the vehicle.

Figure 2:
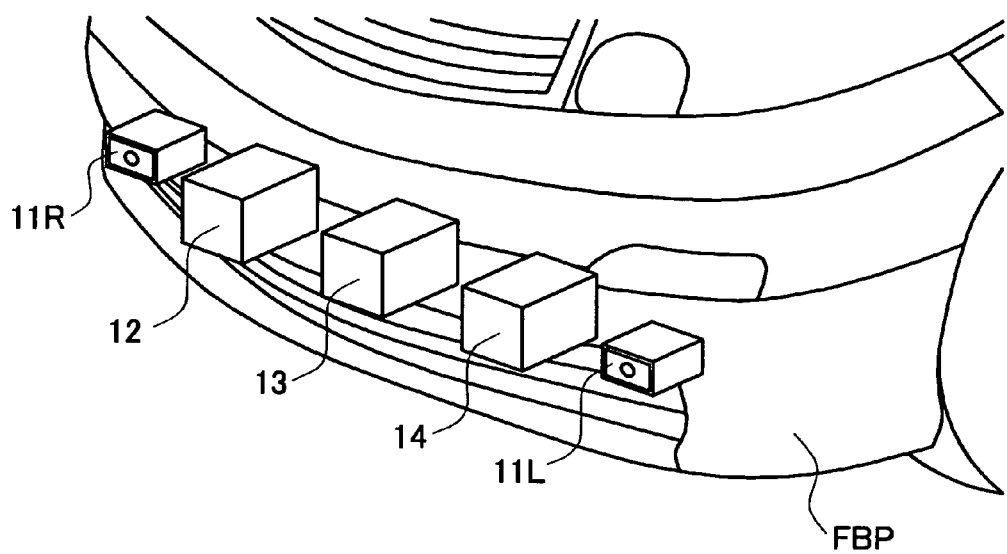
FIG. 2 is a perspective view illustrating a sensor mounting form in a front bumper.
Figure 3:
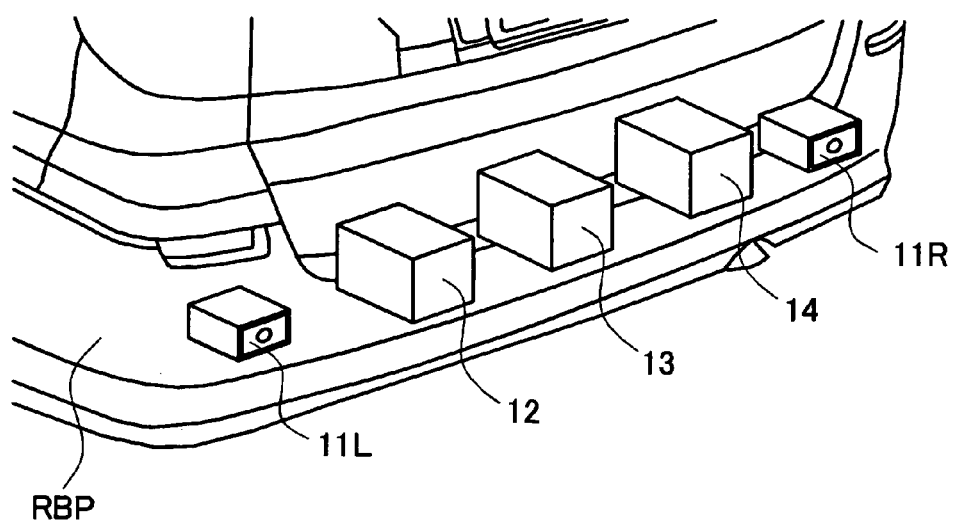
FIG. 3 is a perspective view illustrating a sensor mounting form in a rear bumper.

Configuration and distance inference engine 5d: to designate a configuration, a direction, and a distance of an obstacle which exists in front or in back of the vehicle based on the detection signal of the exterior stereo camera 11, the ultrasonic sonar array 12, the infrared sensor 13, and the laser sensor 14. The obstacle detection system by the infrared sensor 13 or the laser sensor 14 is well-known; thus, the detailed explanation is omitted. In addition, specifying the configuration and distance of the obstacle using the stereo camera is disclosed in Patent documents 6 to 9. Specifying the configuration and distance of the obstacle using the ultrasonic sonar array is disclosed in Patent documents 10 and 11. Information thus disclosed can be used respectively in the present invention. Furthermore, the group of the exterior stereo camera 11 (11L, 11R), the ultrasonic sonar array 12, the infrared sensor 13, and the laser sensor 14 is attached to each of a front bumper FBP of the vehicle illustrated in FIG. 2, and a rear bumper RBP illustrated in FIG. 3, to thereby function as a front obstacle detection means and a back obstacle detection means, respectively.

Figure 4:
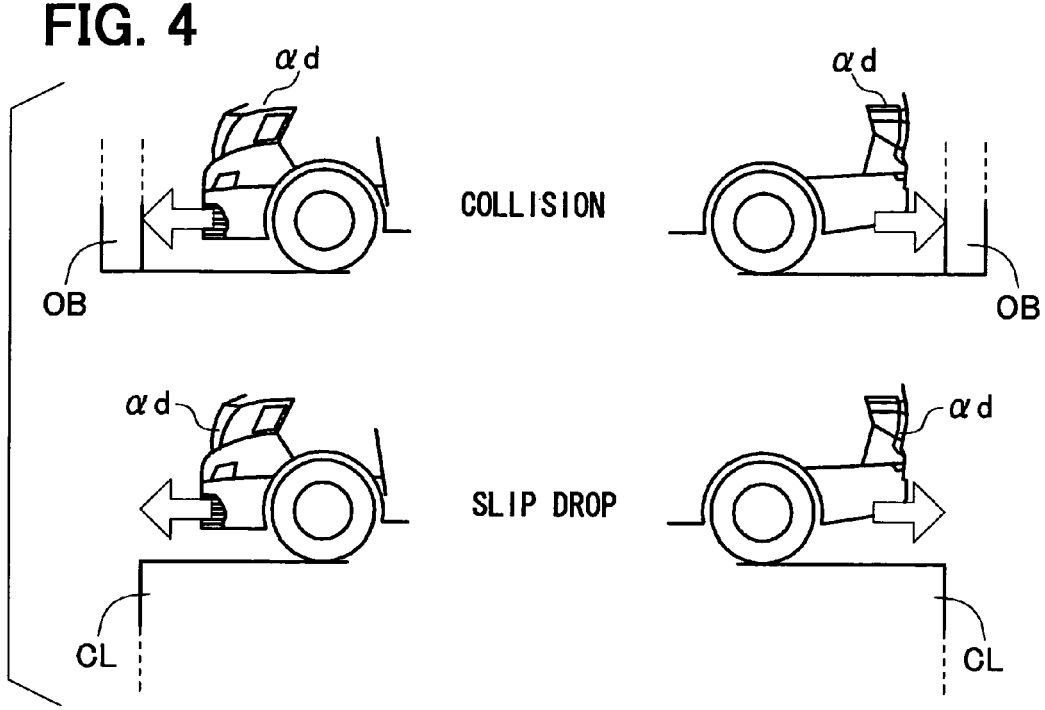
FIG. 4 is a diagram illustrating examples corresponding to basic prevention target patterns.
Figure 5:
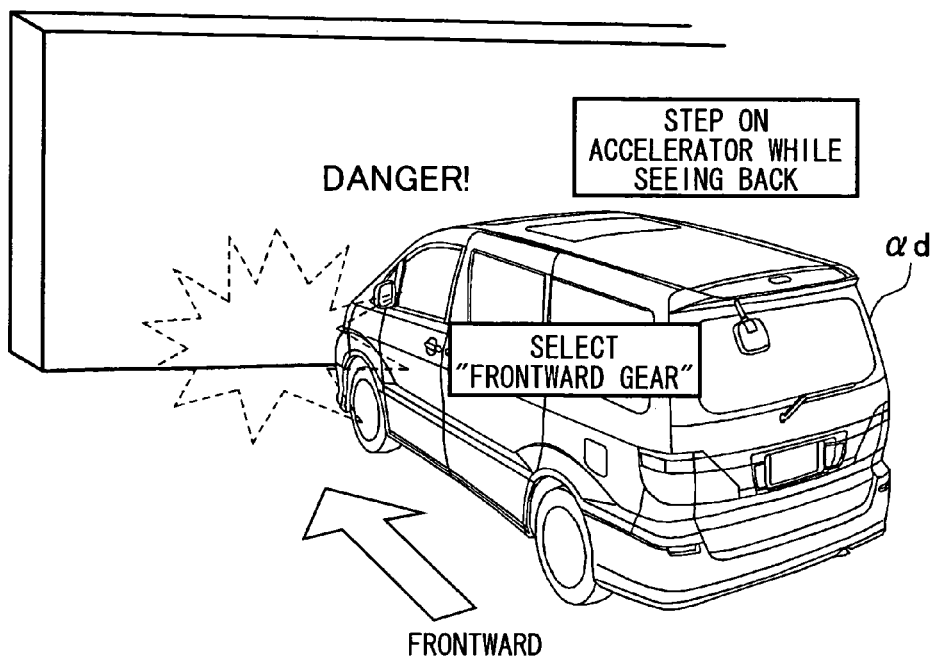
FIG. 5 is a diagram illustrating an example of a scene where a collision with an obstacle arises because of driver's inattention.

Danger inference engine 5e: to designate several determination patterns (patterns 1, 2, 5, and 6) for preventing an incorrect starting-off illustrated in FIG. 7 based on the combination of the shift position (frontward/backward) and the obstacle existence direction (frontward/backward) by the above front obstacle detection means and the back obstacle detection means. The shift position is at the frontward movement gear and the obstacle existence direction is front (pattern 1). The shift position is at the backward movement gear and the obstacle existence direction is back (pattern 6). Each of pattern 5 and pattern 6 is defined as a basic prevention target pattern. (The contents of patterns are stored in the ROM 5 as a form of a table 102). The pattern 1 is illustrated in the left portion of FIG. 4; namely, a collision obstacle OB or a slipping down dangerous place CL (for example, hole, cliff, etc.) exists in front of the vehicle when the shift position is at the frontward movement gear. The pattern 6 is illustrated in the right portion of FIG. 4; namely, a collision obstacle OB or a slipping down dangerous place CL (for example, hole, cliff, etc.) exists in back of the vehicle when the shift position is at the backward movement gear. For example, as illustrated in FIG. 5, an obstacle such as a fence is in front of the vehicle. Although intending to move backward, the gear is mistakenly put into the frontward movement position. If the accelerator pedal 51 is stepped on while looking at the back, the vehicle ad performs an incorrect starting-off frontward to thereby crash into the fence.

The danger inference engine 5e determines whether the present determination pattern corresponds to the basic prevention target pattern (patterns 1 and 6). The present determination pattern is indicated by the detection state of the shift position and the detected direction of the obstacle by the respective obstacle detection means 11, 12, 13, and 14. (prevention target pattern determination means). In addition, when the present determination pattern corresponds to the basic prevention target pattern (1, 6), a collision or interference due to the incorrect starting-off may take place, thus setting the danger degree as +1. In addition, when the present determination pattern corresponds to the other patterns (2, 5) or when the detection distance of the obstacle exceeds a reference threshold distance (for example, 1 to 3 m), a collision or interference due to the incorrect start does not take place, setting the danger degree as 0.

The accelerator sensor 8 is configured as an angle sensor which detects the stepping-on angle of the accelerator pedal 51. In addition, the brake sensor 9 is configured also as an angle sensor which detects the stepping-on angle of the brake pedal 61. (In addition, when detecting only the presence or absence of the brake pedal stepped on, a brake switch used for driving a taillight may be diverted).

Next, the electronic throttle control apparatus 21 (driver 21d) is connected to the input/output interface 6 of the ECU 2. The electronic throttle control apparatus 21 activates the drive motor 22 so that the throttle valve 23 serves at the opening degree indicated by the ECU 2. The ECU 2 indicates the opening degree while referring to the accelerator stepping-on amount (accelerator position) by the accelerator sensor 8.

Figure 19:
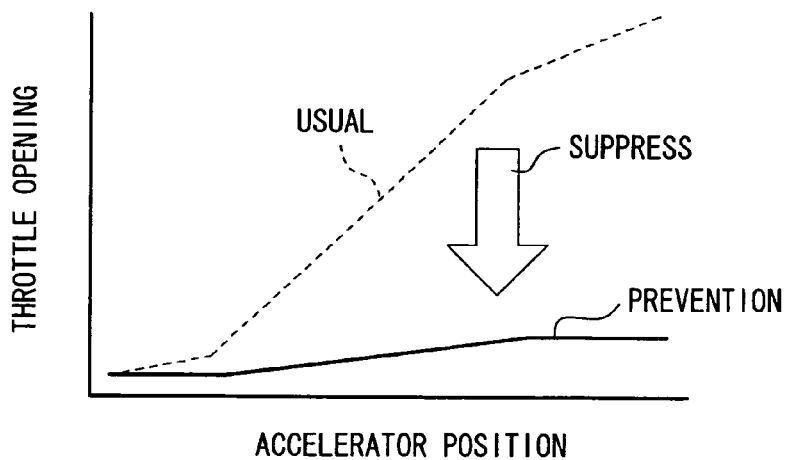
FIG. 19 is a diagram explaining an example of suppressing travel movement by restricting throttle opening.

As illustrated in FIG. 19, the throttle opening degree in a usual case changes like the dashed line according to the accelerator position. In contrast, in the incorrect starting-off prevention process, as the solid line illustrates, the increasing rate of the throttle opening degree according to the accelerator position is reduced than as the above usual case. Thus, although the accelerator pedal 51 is stepped on greatly, the throttle valve is kept from opening greatly. (That is, a travel suppression means (an incorrect starting-off prevention output means) is thus configured: the above incorrect starting-off prevention process is managed by an incorrect starting-off prevention output control engine 5f, which is stored in the ROM 5.) Furthermore, at the incorrect starting-off prevention process in FIG. 19, a slight movement starting-off is allowed. That is, a control in the incorrect starting-off prevention process is made so that the throttle valve opens at the opening degree smaller than that in the usual case when the accelerator pedal is stepped on. In this regard, however, the control in the incorrect starting-off prevention process may be made such that the vehicle does not move at all. That is, the control in the incorrect starting-off prevention process may be made such that the opening degree of the throttle valve serves as zero regardless of the stepping-on amount of the accelerator pedal.

Furthermore, the fuel injection control apparatus 25 (driver 25d) is connected to the input/output interface 6 of the ECU 2. The fuel injection control apparatus 25 adjusts the opening degree of the solenoid injection valve 26 of the fuel injector by the instruction from the ECU 2 (That is, a travel suppression means (an incorrect starting-off prevention output means) is thus configured.) At the incorrect starting-off prevention process, the opening degree of the solenoid injection valve is reduced than at the usual case. When the accelerator pedal is stepped on, the fuel injection is prohibited or reduced in the injection amount.

Furthermore, a constituent element achieving the travel suppression means at the incorrect starting-off prevention process may be configured as a combination of both the electronic throttle control apparatus 21 and the fuel injection control apparatus 25. Instead, such a constituent element may be configured of either the electronic throttle control apparatus 21 or the fuel injection control apparatus 25.

Next, the I/O interface 6 of the ECU 2 is connected via drivers the following various devices functioning as the incorrect starting-off prevention output means via respective drivers.

Accelerator vibration section 53 (driver 51d): to output vibration towards the foot of the driver stepping on the accelerator pedal 51. Vibration, which is not usually practical, is given to the accelerator pedal providing an effect for the driver to take the foot off the pedal suddenly. A well-known vibration generator such as an eccentricity type excitation apparatus may configure the section 53. The vibration of the accelerator vibration section 53 transmitted to the accelerator pedal 51 is specified in frequency and amplitude so as to provide no influence to the angle output of the accelerator sensor 8 that is transmitted to the electronic throttle control apparatus 21. (If the vibration variation is overlapped over the angle output of the accelerator sensor 8, it may be removed using a filtering circuit or the like.)

Brake reactive force motor 62 (driver 62d): to be attached to the revolving shaft of the brake pedal 61, and generate the reactive force reverse to the stepping-on direction of the brake pedal 61. At the usual case, the stepping-on reactive force to the brake pedal 61 is generated by the pedal backup spring 61s. In contrast, at the incorrect starting-off prevention process, the brake reactive force motor 62 is operated to increase the stepping-on reactive force to the brake pedal 61 compared with the usual case (Stepping-on reactive force control means). In addition to the above, the ECU 2 changes the braking pressure instruction value so as to increase the increasing rate of the braking pressure against the stepping-on amount of the brake pedal 61 compared with the usual case (braking pressure control means). These stepping-on reactive force control means and the braking pressure control means constitute a braking assistance means. The actual process is managed by the incorrect starting-off prevention output control engine 5f.

While increasing the increasing rate of the braking pressure against the stepping-on amount of the brake pedal 61 compared with the usual case, the stepping-on reactive force to the brake pedal 61 is also increased compared with the usual case. As a result, the braking effect almost equal to that in the usual case can be obtained by a smaller stepping-on amount as compared with the case where the braking assistance is not performed in particular, if the brake stepping-on force is almost equivalent to that in the usual case. However, the stepping-on reactive force of the brake pedal 61 is larger than that at the usual case, providing the driver with an insufficient sense of incongruity. The driver therefore tries to step on the brake pedal 61 further. As a result, the braking pressure goes up and the effect of the braking assistance is obtained.

Figure 21:
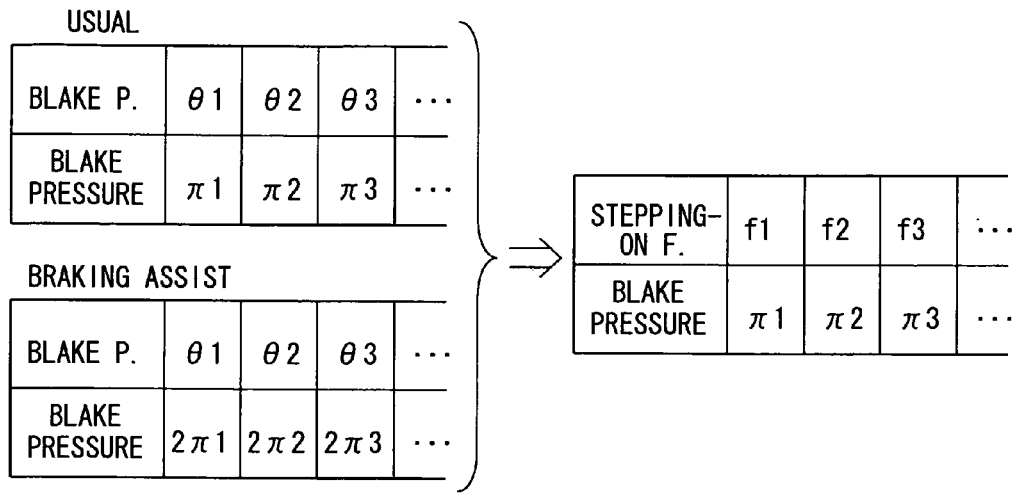
FIG. 21 is a first diagram explaining a braking assistance process.

In order to understand easily, refer to FIG. 21. The braking pressure instruction values are specified in the usual case as $\pi 1, \pi 2$, and ... against the brake positions $\theta 1, \theta 2$, and .... In contrast, the braking pressure instruction values are specified in the braking assistance as $2\pi 1, 2\pi 2$, and ... against the brake positions $\theta 1, \theta 2$, and ... against the same brake positions $\theta 1, \theta 2$, and .... In addition, the value of the brake reactive force at the brake position $\theta 1, \theta 2$, and ... is also doubled compared with that at the usual case (That is, the magnifying power of the braking pressure instruction value at the braking assistance is equal to the magnifying power of brake reactive force).

Figure 22:
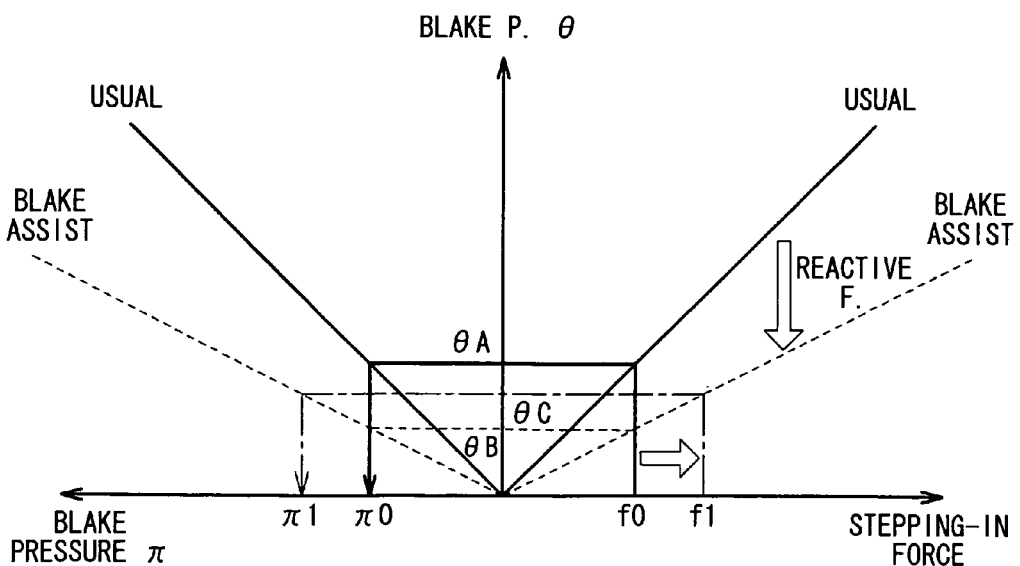
FIG. 22 is a second diagram explaining a braking assistance process.

With reference to FIG. 22, at the usual case (i.e., with no increase in the reactive force by the brake reactive force motor 62: solid line), at the force f0 of the stepping-on of the brake pedal, the brake position is $\theta A$ and the braking pressure instruction value $\pi 0$. In contrast, when the braking assistance is made, as illustrated as the dashed line, the reactive force increases. Thus, the increasing rate of the brake position $\theta$ against the stepping-on force f is reduced to the half, whereas the increasing rate of the braking pressure against the brake position $\theta$ is enlarged twice. Therefore, although the brake position at the same stepping-on force f0 is set to the half $\theta B$, the enlargement of the increasing rate of the braking pressure offsets to thereby keep the braking pressure instruction value at the same $\pi 0$. It is noted that although the brake pedal is stepped on by the same force as usually, the pedal does not fall as usual, thereby causing the driver to sense that the stepping-on amount is still insufficient. Thereby, the stepping-on force is increased to f1 so that the usual stepping-on amount can be approached (alternate long and short dash line). As a result, the brake position increases from $\theta B$ to $\theta C$, and the braking pressure instruction value also increases to $\pi 1$.

Furthermore, it is also possible not to perform the reactive force enlargement process but to perform only enlargement of the braking pressure instruction value against the brake position as the braking assistance process. However, at such braking assistance process, the braking pressure increases rapidly by the usual stepping-on force, possibly posing a concern which leads to excessive braking. In contrast, when the reactive force enlargement process is performed as mentioned using FIG. 22, the usual stepping-on force does not provide so much change in the effectiveness of the brake. Thus, the driver feels the shortage of the stepping-on and then increases the stepping-on amount, thereby increasing step by step and providing an advantage of helping prevent the excessive braking.

Seat vibrator 71 (driver 71d): to be laid under the driver's seat 72, and perform the vibration output for paying an attention to the incorrect starting-off. For example, the attention effect can be further heightened by giving the driver the unusual vibration or vibration which results from the vehicle stepping on something. A well-known vibration generator such as an eccentricity type excitation apparatus or piezo-electric type excitation apparatus may configure the seat vibrator 71.

Meter 81M and car navigation apparatus 81 (driver 81d), in-mirror display section 82 (driver 82d), and HUD (head-up display) 83 (driver 83d): to call attention of the driver to a physically structured object inside a compartment of the vehicle gazed by the driver (or located within the sight field of the driver). At the backward movement, the inner mirror (rearview mirror: in-mirror display apparatus), the outer mirror (side view mirror: in-mirror display apparatus), the rear glass (HUD), etc. can be used. At a back guide monitor being mounted in the vehicle, the monitor of the car navigation apparatus 81 can be also used. In contrast, at the frontward movement, a monitor of the meter 81M, a windshield (HUD), and the car navigation apparatus 81, etc. can be used.

Figure 23:
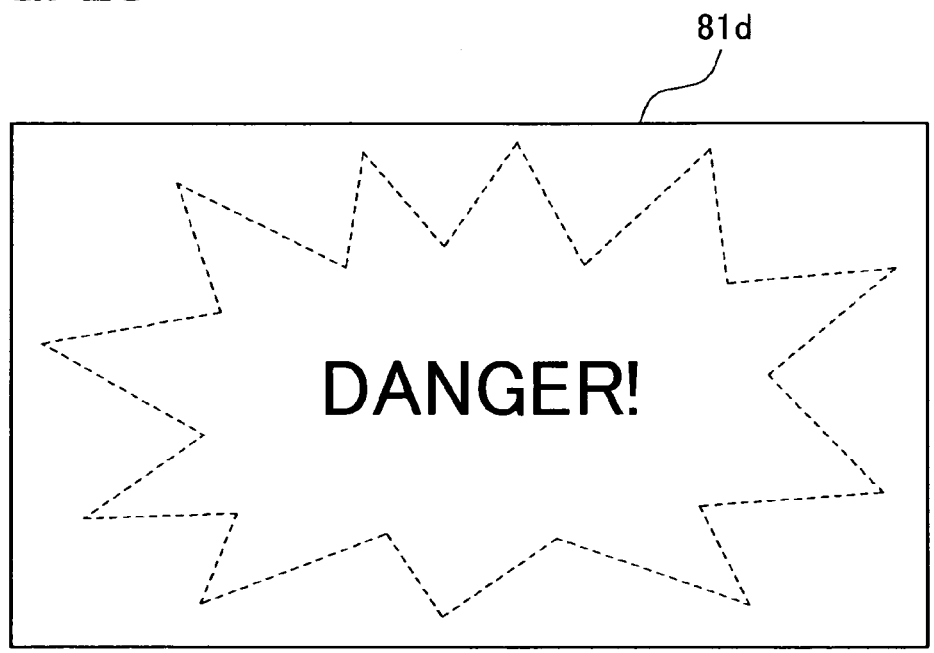
FIG. 23 is a diagram illustrating an example of a danger report output by displaying.

The inner mirror and the outer mirror are used as a half mirror, for example. The display is made by an LED etc. from the rear side of the mirror. Instead, a transparent EL display is overlapped over the front face of the mirror and the display can be made. In the windshield or the rear glass, the HUD (the transparent EL display may be sufficient) performs the alarm display. In addition, in the case of the meter 81M, an attention to the incorrect starting-off is performed by carrying out an icon display of the unusual state, or blinking a dial plate or a whole display screen using the apbsematic coloration of the red or the like. When a back light of the meter 81M is configured of a full color LED, lighting of aposematic coloration can be also outputted. In contrast, in the case of the car navigation apparatus 81, as illustrated in FIG. 23, an icon (image) for calling attention to a danger is displayed in a great display size on the screen of the monitor with the background drawn in aposematic coloration.

Figure 24:
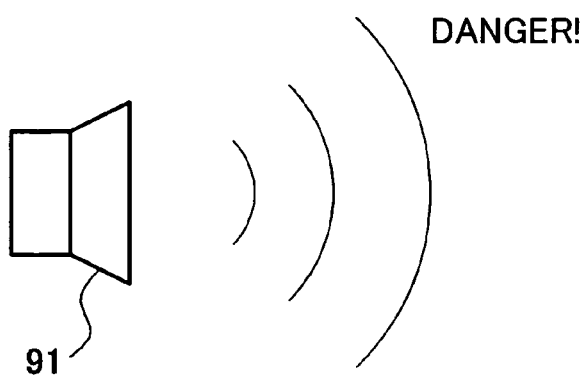
FIG. 24 is a diagram illustrating an example of a danger report output by voice.

Speaker 91 (driver 91d): to sound a range of tones causing a person to sense a danger (high frequency, and strident or like people's scream: refer to FIG. 24) and halt the present determination. Although a speech guide is also sounded simultaneously, the speech guide requires time for listening to and understanding the language; thus, momentary determination by persons is not expectable. Accordingly, it is important that the speech guidance should be presented simultaneous with the tone signal which provides the sense of crisis instinctively.

Smell generator 93 (driver 93d): to make a danger sensed and generate a scent which stops operation. The smell is generated which can be instantly concentrated on. In such a case, since the smell is transmitted with the flow of air, it is desirable to take into consideration an air gun or an air flow control as a combination.

Figure 11:
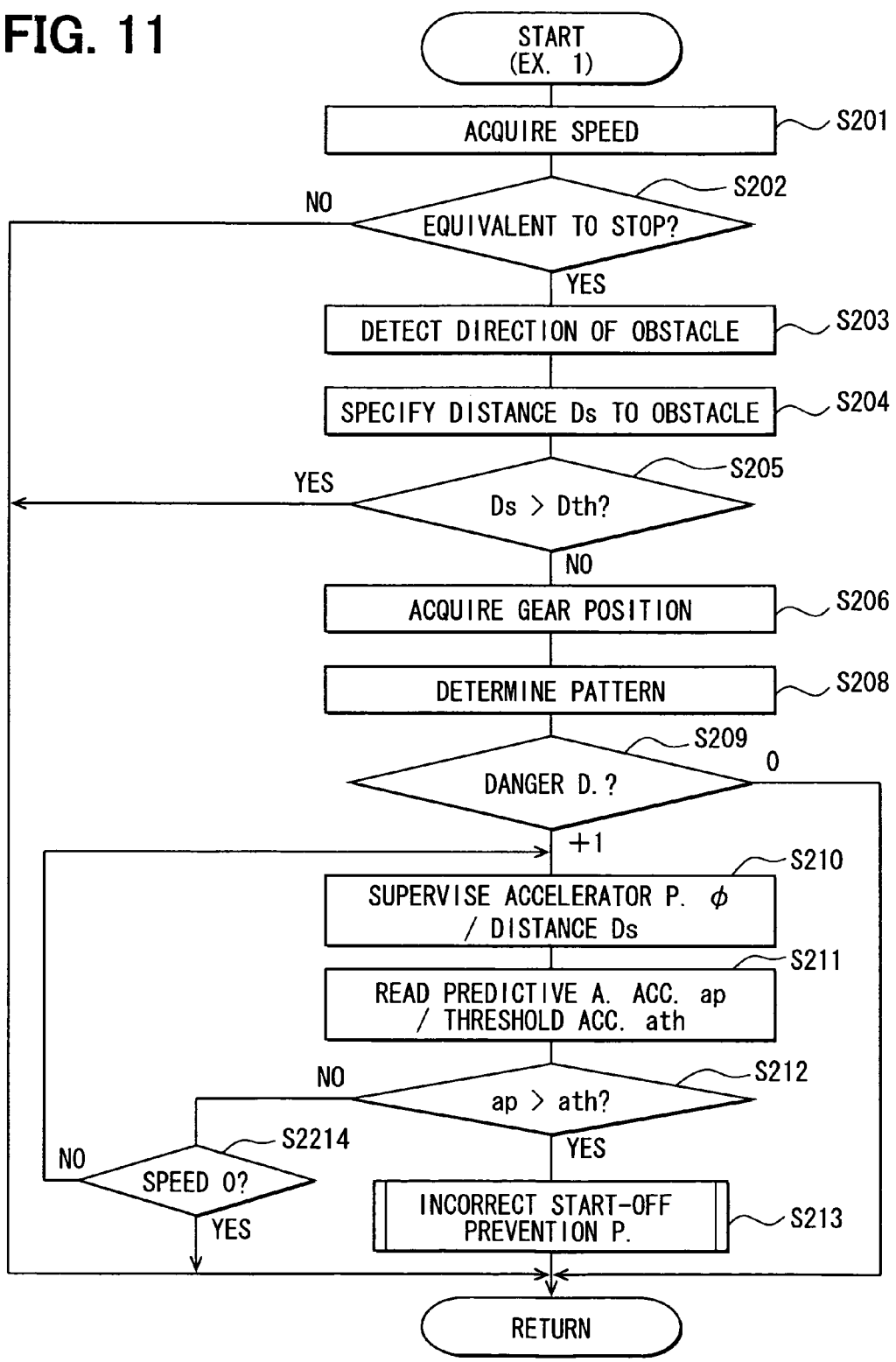
FIG. 11 is a flow chart illustrating a first example of a process to perform incorrect starting-off prevention.

The following describes an example of an incorrect starting-off prevention control of the vehicle control system 1 with reference to a flow chart. FIG. 11 shows an example of a control process of a program (i.e., programmed control) in cases that the driver's gaze direction is not taken into consideration (the person camera 10 of FIG. 1 may be omitted). When the ignition switch 15 (FIG. 1) is turned into an ON state and the shift position is moved to the frontward position or backward position, the program is started and repeated continuously. In S201, the vehicle speed value is acquired from the output of the wheel speed sensor 16. In S202, it is determined whether the acquired vehicle speed is a minimal speed equivalent to a stop (for example, a determination speed threshold value is 1-3 km/h). When it is not a minimal speed equivalent to a stop, any incorrect starting-off prevention control is not performed.

In contrast, when it is a minimal speed equivalent to a stop, it is determined that the present state is an initial movement state. In S203 and S204, based on the detection results of above-mentioned exterior stereo camera 11, the ultrasonic sonar array 12, the infrared sensor 13, and the laser sensor 14, the obstacle's existence direction and distance are specified. In S205, it is determined whether the distance to the specified obstacle is equal to or less than a reference threshold distance Dth (for example, 3-5 m). When no obstacle exists or, when the existing obstacle is distant from the reference threshold distance Dth even if an obstacle exists, an incorrect starting-off prevention control is not performed in particular.

When the obstacle exists equal to or less than the reference threshold distance Dth, it is determined that there is a possibility that an interference due to the incorrect starting-off takes place. The processing advances to S206, where the shift position (gear position) is acquired. The processing advances to S208, where it is determined to which pattern in the pattern table 102 in FIG. 7 the prevention determination pattern indicated by a set of the obstacle existence direction and the shift position direction corresponds. Like the above-mentioned acquiring the incorrect starting-off danger degree, when the shift position direction and the obstacle existence direction correspond to the basic prevention target pattern (patterns 1 and 6), the incorrect starting-off danger degree is set as +1. Otherwise, the incorrect start danger degree is set as 0. When the incorrect starting-off danger degree is set as 0, the incorrect starting-off prevention control is not performed specially.

Figure 8:
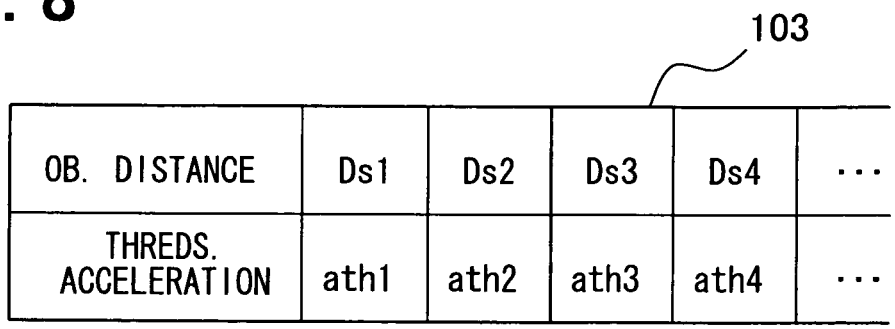
FIG. 8 is a schematic diagram illustrating an example of a threshold acceleration.

In contrast, when the incorrect starting-off danger degree is set as +1, the processing advances to S210, then entering a supervision mode of an incorrect starting-off sign action. Herein, as illustrated in FIG. 8, a table 103 is previously prepared which provides a threshold acceleration ath depending on a remaining distance Ds to an obstacle. The threshold acceleration signifies an acceleration by which the vehicle can be stopped before interfering with the obstacle. In S210, the accelerator position (stepping-on amount) $\phi$ and the remaining distance Ds are supervised. In S211, based on the relation of the accelerator position $\phi$ and the predictive accessible acceleration ap which are illustrated in FIG. 6, a predictive accessible acceleration corresponding to the acquired accelerator position is calculated. In addition, with reference to the table 103, the threshold acceleration ath corresponding to the remaining distance Ds is acquired. In S212, the both are compared with each other. If the predictive accessible acceleration ap is over the threshold acceleration ath, the processing advances to S213, the incorrect starting-off prevention output takes place.

That is, even if the accelerator pedal serves as the accelerator position $\phi$, the engine does not immediately shift to the state of the corresponding engine output (throttle opening degree or fuel injection). A fixed response delay time exists. That is, in a duration of the response delay time, the driving operation, in which the accelerator pedal 51 is stepped on by the level at which the predictive accessible acceleration ap exceeds the threshold acceleration ath, is regarded as an incorrect starting-off sign action or driving operation. Within the duration of the response delay time, a certain incorrect starting-off prevention output is performed, thereby helping prevent the interference with the obstacle.

An incorrect starting-off prevention output is made as illustrated in FIG. 19. The increasing rate of the throttle opening degree according to the accelerator position is reduced rather than that at the above usual case. The travel suppression process is performed such that even though the accelerator pedal is stepped on greatly, the throttle valve is not opened greatly. In addition, instead of the travel suppression process using the electronic throttle control apparatus 21, or along with the travel suppression process, another process may be adopted as follows. The opening degree of the solenoid injection valve of the fuel injection control apparatus 25 is reduced than that at the usual case; thus, when the accelerator pedal 51 is stepped on, the fuel injection is prohibited or the injection quantity is made low.

In addition, the above process is to prevent the vehicle from accelerating compulsorily more when the accelerator has been stepped on. In order to cause the driver to notice an anomaly and separate the foot from the accelerator pedal, it is also important to simultaneously perform the above-mentioned report output for calling for attention to danger. As already explained, the report output is performed by using at least one of the seat vibrator 71, the meter 81M, the car navigation apparatus 81d, the in-mirror display section 82, the HUD 83, the speaker 91, and the smell generator 93, as already explained contents.

When it succeeds in once separate the driver's foot from the accelerator pedal, the driver typically steps on the brake pedal. In such a case, in order to stop the vehicle certainly in a few remaining distances to the obstacle, it is also effective to cause the brake reactive force motor 62 to perform the brake assistance process already explained using FIGS. 21 and 22.

Returning to FIG. 11, when the predictive accessible acceleration ap does not exceed the threshold acceleration ath, the processing advances to S214, where the vehicle speed is determined again. In this case, the driver may perform deceleration to the brake from the accelerator by a normal driving operation. If the vehicle can be stopped without problems, the speed becomes zero. Therefore, when the speed is zero in S2214, the process is ended. In contrast, when the speed is not zero, the possibility of incorrect start remains succeedingly. The processing returns to S210, thereby repeating the same processing.

Figure 9:
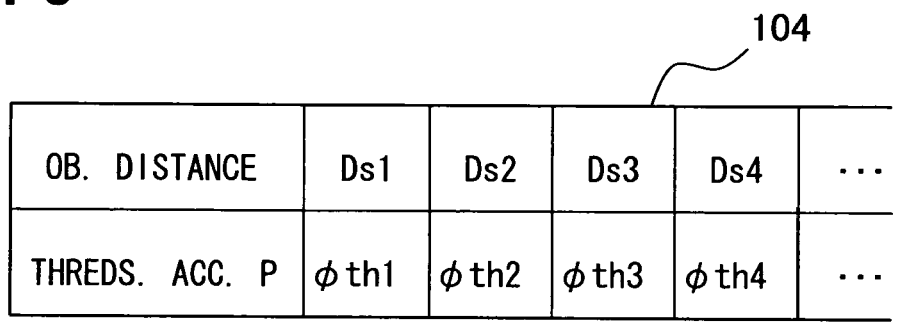
FIG. 9 is a schematic diagram illustrating an example of a threshold accelerator position.
Figure 12:
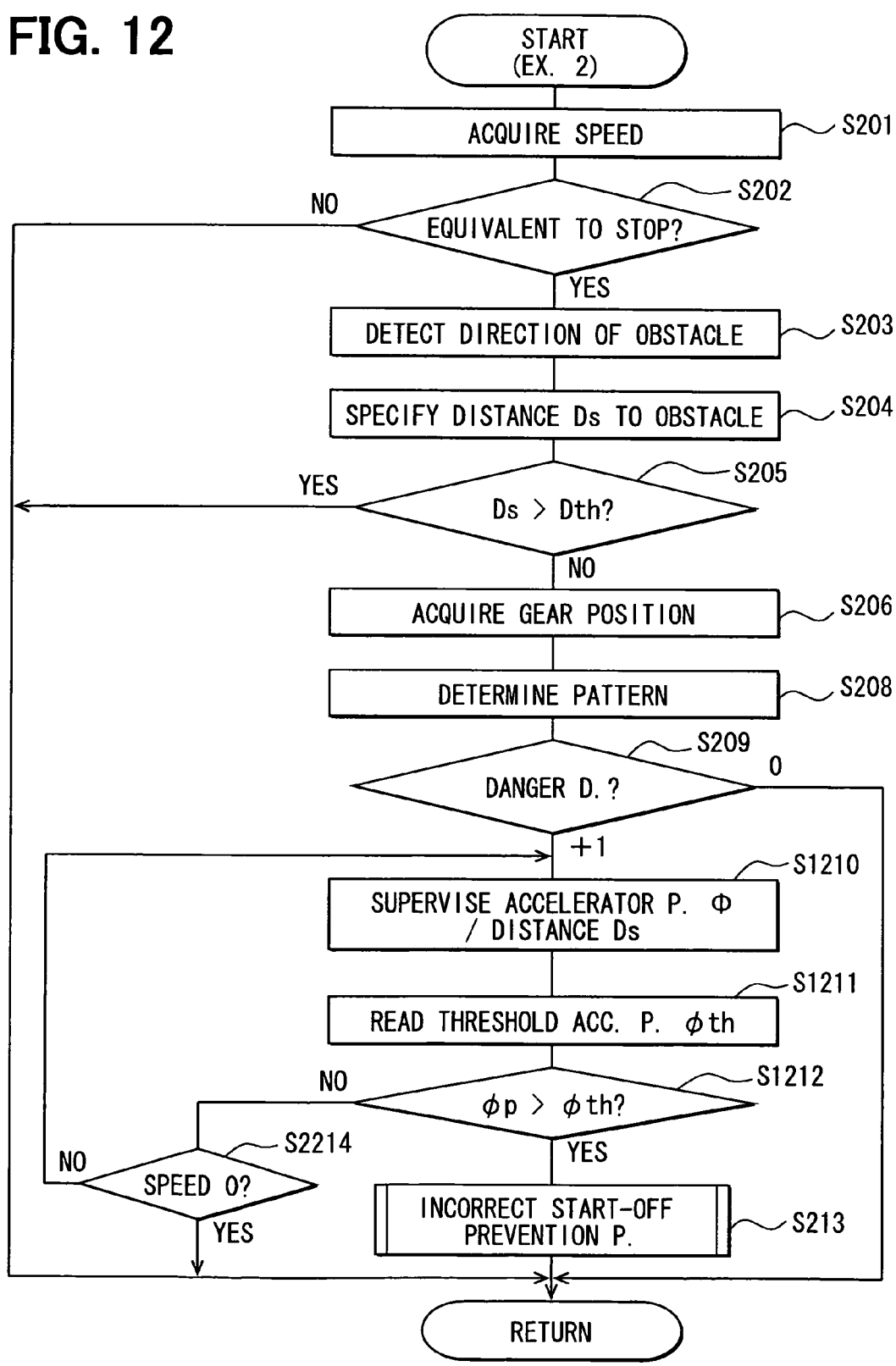
FIG. 12 is a flow chart illustrating a second example of a process to perform incorrect starting-off prevention.

It is noted that in the processing of FIG. 11, the predictive accessible acceleration ap corresponding to the acquired accelerator position phi is once calculated, and it is determined whether an incorrect starting-off prevention output is performed, by comparing the predictive accessible acceleration ap with the threshold acceleration ath. Instead, another may be adopted as shown in FIG. 9. A table 104 is prepared which specifies a threshold value $\phi$th of the accelerator position itself corresponding to the remaining distance Ds to the obstacle. It may be determined whether the incorrect starting-off prevention output is performed by directly comparing the acquired accelerator position $\phi$ with the threshold accelerator position $\phi$th. This case is illustrated as a flow chart of FIG. 12 (since there are many common features with FIG. 11, only difference is explained). That is, suppose that the incorrect start danger degree is +1 in S209. In S1210, with reference to the table 103, the threshold accelerator position $\phi$th corresponding to the remaining distance Ds is acquired. In S1212, the accelerator position $\phi$ acquired by S1212 is compared with the threshold accelerator position $\phi$th. If $\phi>\phi$th, the processing advances to S213, where the incorrect starting-off prevention output takes place.

Figure 10:
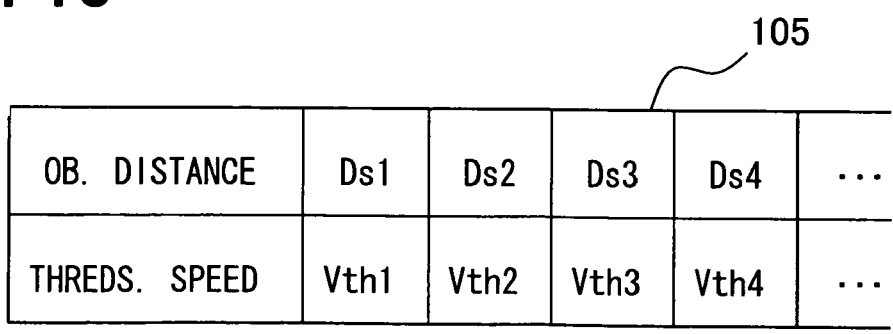
FIG. 10 is a schematic diagram illustrating an example of a threshold vehicle speed.
Figure 13:
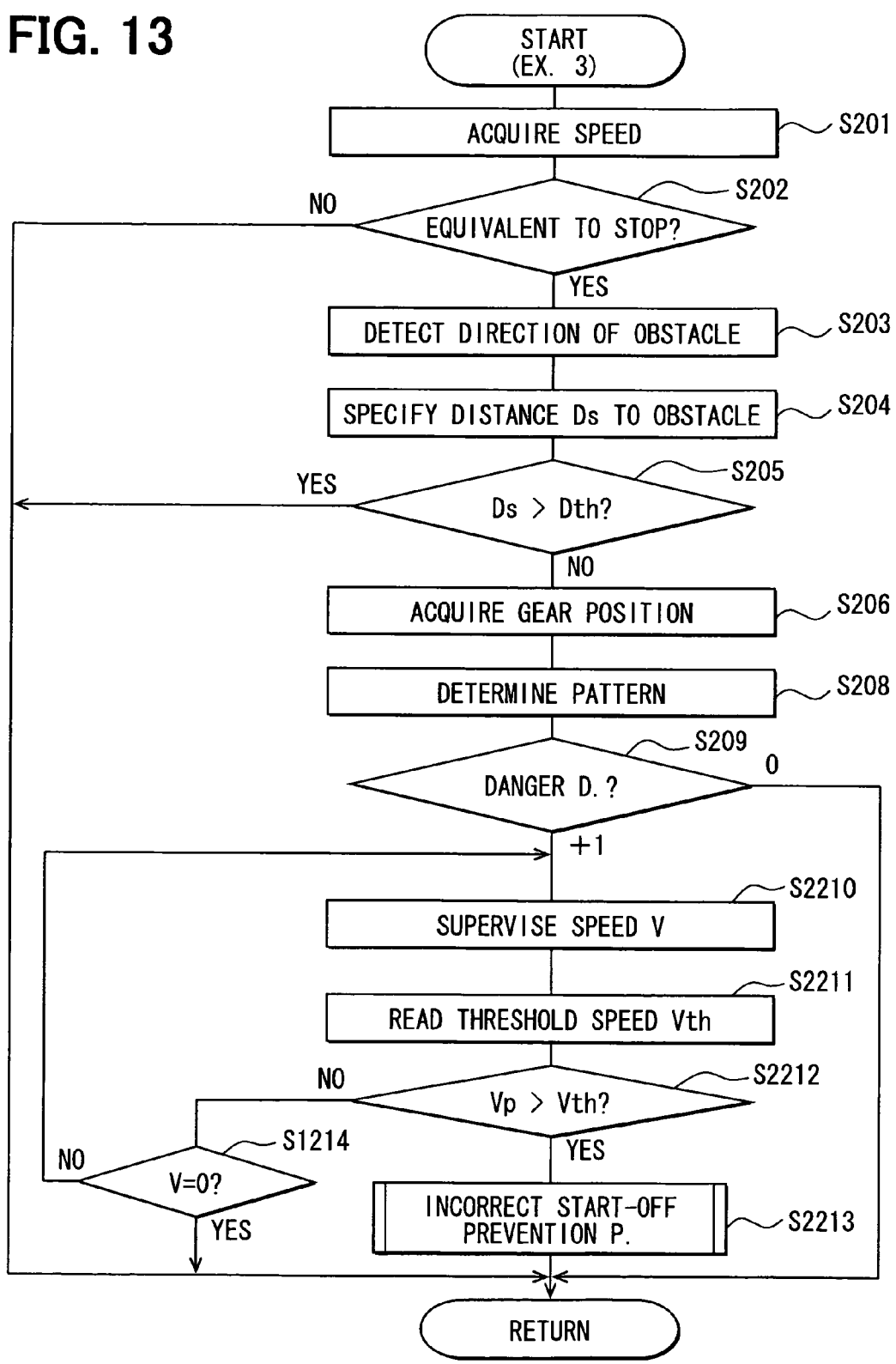
FIG. 13 is a flow chart illustrating a third example of a process to perform incorrect starting-off prevention.

Further, instead, another may be adopted as illustrated in FIG. 10. A table 105 is previously prepared which indicates the threshold speed Vth corresponding to the remaining distance Ds to an obstacle. It may be determined whether the incorrect starting-off prevention output is performed by directly comparing the acquired speed V with the threshold speed Vth. This case is illustrated as a flow chart of FIG. 13

(since there are many common features with FIG. 11, only difference is explained). That is, if the incorrect starting-off danger degree is +1 in S209, the speed V is acquired again in S2210. In S2211, with reference to the table 105, the threshold speed Vth corresponding to the remaining distance Ds is acquired. The speed V acquired in S2212 is compared with the threshold speed Vth. If V>Vth, the processing advances to S213, where the incorrect starting-off prevention output takes place. In this case, in the basic prevention target pattern is effectuated where the remaining distance Ds to the obstacle is less than the threshold distance Dth, the driving operation state, where the speed V comes to be more than the threshold speed Vth, is regarded as an incorrect starting-off sign driving operation state.

Figure 14:
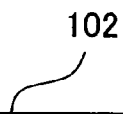
FIG. 14 is a schematic diagram illustrating a second example of a pattern table.

Next, the following explains an example of a programmed control when the driver's gaze direction is considered. Here, a newly added pattern determination element is whether the driver's gaze direction (direction of the face or sight line) accords with an obstacle's existence direction. As illustrated in FIG. 14, a pattern table 102 contains eight prevention determination patterns. There is no change with respect to the basic prevention target pattern, which corresponds to the condition that the shift position direction and the obstacle existence direction accord with each other. When the driver's gaze direction does not accord with the same direction as the shift position direction and the obstacle existence direction, it is supposed that the present state corresponds to a greatly dangerous prevention target patterns (patterns 3 and 8: incorrect starting-off danger degree set as +2). When the driver's gaze direction accords with the same direction as the shift position direction and the obstacle existence direction, it is supposed that the present state corresponds to a usual prevention target pattern (patterns 1 and 6: incorrect starting-off danger degree set as +1). In addition, in case that the shift position direction and the obstacle existence direction do not accord with each other, the driver's gaze direction may be contrary to the shift position direction (patterns 4 and 7). Such cases correspond to the state in which the attention of the driver is insufficient with respect to the direction to which the vehicle starts movement. This indicates a possibility that the driver may be unable to respond to a sudden running out etc., thereby setting the incorrect starting-off danger degree as +1. The other remaining patterns (2, 5) are assigned with the incorrect starting-off danger degree of 0, respectively. Furthermore, when the shift position direction and the obstacle existence direction do not accord with each other, the incorrect starting-off danger degree may be set as 0 regardless of the driver's gaze direction. Further, instead, when the shift position direction and the driver's gaze direction do not accord with each other, the incorrect starting-off danger degree may be set as +2 regardless of the obstacle existence direction. (The incorrect starting-off danger degree of other patterns are as illustrated in FIG. 14).

Figure 15:
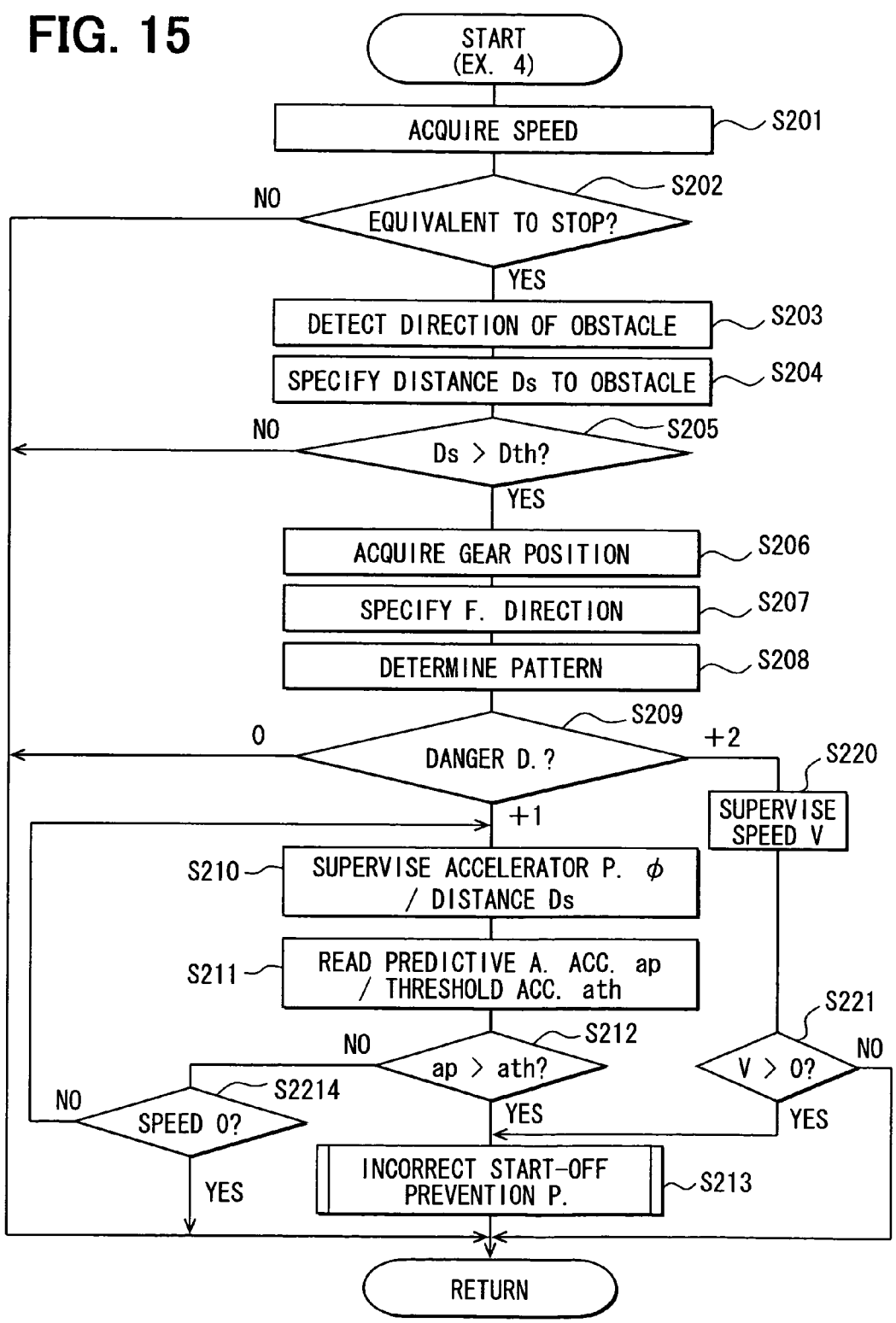
FIG. 15 is a flow chart illustrating a fourth example of a process to perform incorrect starting-off prevention.

A process example in such a case is illustrated in FIG. 15. Differences from the process of FIG. 11 are explained below. Prior to the determination of the prevention determination pattern in S208, the gaze direction (direction of the face) of the driver is specified in S207. In S209, the processing branches based on which degree of 0, +1, and +2, the incorrect starting-off danger degree is. When the incorrect starting-off danger degree is 0 or +1 in S209, the same processing as that of FIG. 11 is made. Furthermore, the steps group of S210→S211→S212 can be replaced by S1210→S1211→S1212 of FIG. 12, or S2210→S2211→S2212 of FIG. 13.

In contrast, in case that the incorrect starting-off danger degree is +2, although the vehicle is going to start towards the obstacle, the driver does not gaze at the obstacle or the direction of starting-off, therefore signifying that the present state is in a very dangerous state. When the speed V again acquired in S220 is not zero, namely, when the vehicle moves even if only a little, the processing advances immediately to S213, where the incorrect starting-off prevention process takes place. Furthermore, the detection that the speed of the vehicle is zero may be made based on the detection of the brake pedal not being stepped on by the brake sensor, or based on the reduction of the remaining distance Ds to an obstacle.

Figure 16:
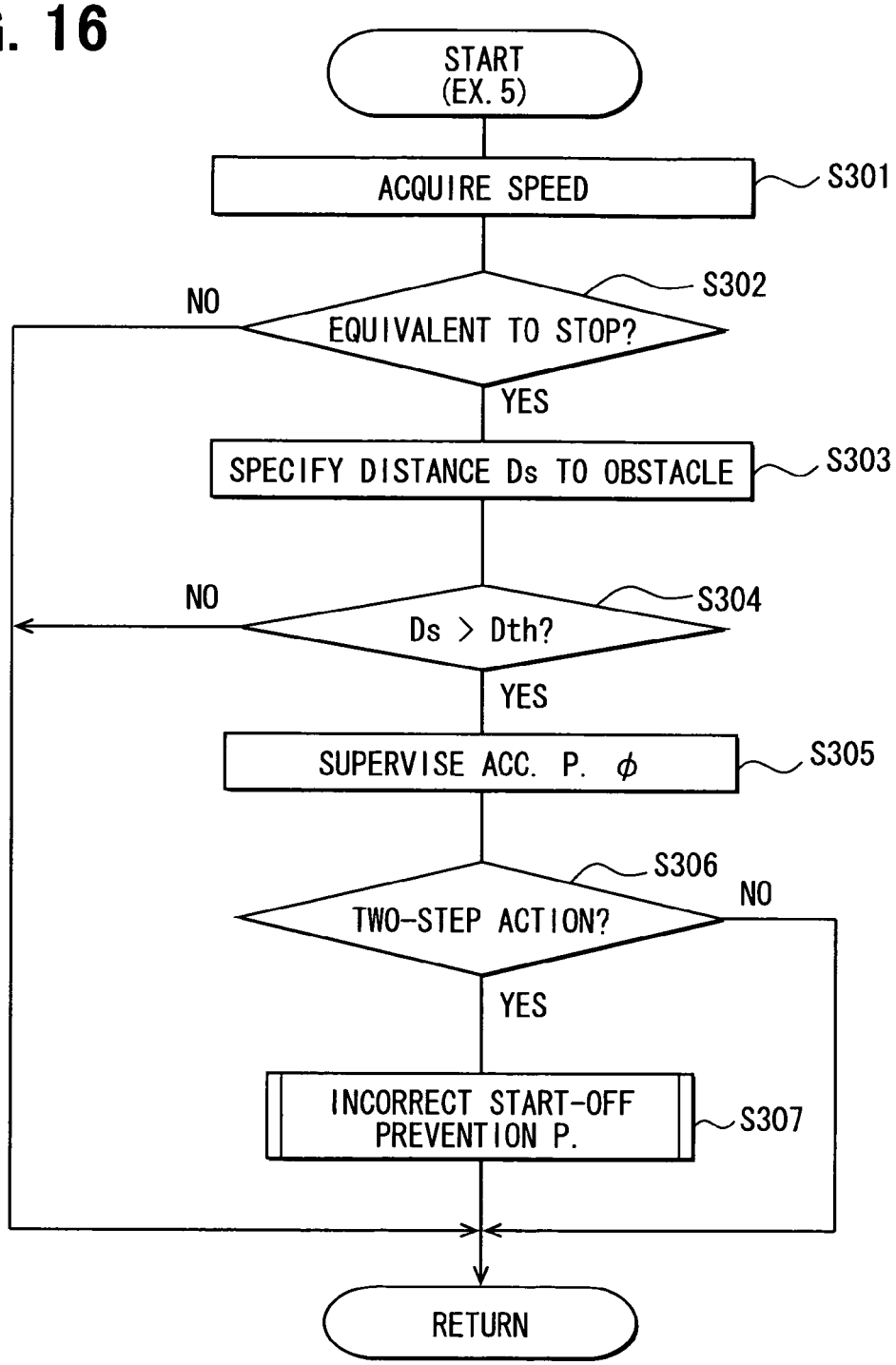
FIG. 16 is a flow chart illustrating a fifth example of a process to perform incorrect starting-off prevention.

Next, suppose a case that although the vehicle approaches an obstacle, the braking operation is delayed or forgotten, or the accelerator is mistakenly stepped on. Such a driving operation may be considered as an incorrect starting-off sign driving operation, thereby causing the incorrect starting-off prevention process to take place. FIG. 16 illustrates an example of a process using the mistakenly stepping on the accelerator pedal, instead of the brake pedal, as the incorrect starting-off sign driving operation. The mistaken stepping on the accelerator pedal instead of the brake pedal is an incorrect driving operation having a high level in emergency and danger. When the corresponding accelerator position change is specified, the pattern determination is not performed but the incorrect starting-off prevention process takes place immediately. First, in S301 and S302, the initial movement state is determined like in S201 and S202 of FIG. 11. In S303, the distance Ds to an obstacle is specified. In S304, the specified distance Ds is compared with the reference threshold distance Dth. If being less than the reference threshold distance Dth, the processing advances to S305, where a supervision state takes place which supervises the accelerator position $\phi$.

Figure 20:
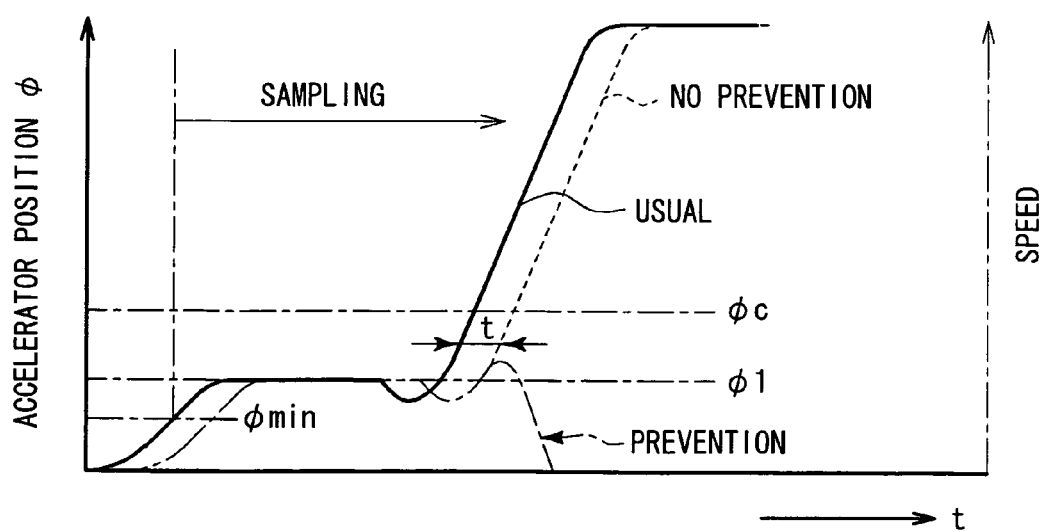
FIG. 20 is a diagram explaining an effect in a case that a two-step action of an accelerator position as an incorrect starting-off sign driving operation state.

On the scene of mistakenly stepping on the accelerator pedal instead of the brake pedal, the driver starts the movement of the vehicle at a slow speed without noticing an existence of an obstacle. As illustrated in FIG. 20, the accelerator stepping-on amount is comparatively small ($\phi c > \phi 1 > \phi min$: the first zone). However, immediately when the driver notices the obstacle, the driver steps on the accelerator pedal to the utmost limit in confusion with an intension to brake hard, causing the accelerator pedal position to rapidly change to exceed the utmost limit value $\phi c$. That is, the time-based variation of the accelerator position exhibits a typical two-step action to transit in a discontinuous manner from the first zone of the slow speed state (less than threshold value) to the second zone of the suddenly accelerated state due to the incorrect driving operation of the sudden braking. Therefore, it is determined whether the two-step action is present or not by determining whether two zones interleaved with the utmost limit $\phi c$ is present or not, thereby enabling specifying the mistake of stepping on the accelerator pedal instead of the brake pedal. If the above-mentioned travel suppression due to the throttle opening degree restriction etc. is not performed, the speed increases rapidly to cause the rapid starting-off as illustrated in dashed line in FIG. 20. In contrast, if the travel suppression is performed, the rapid starting-off can be prevented as illustrated in an alternate long and short dash line in FIG. 20.

Figure 17:
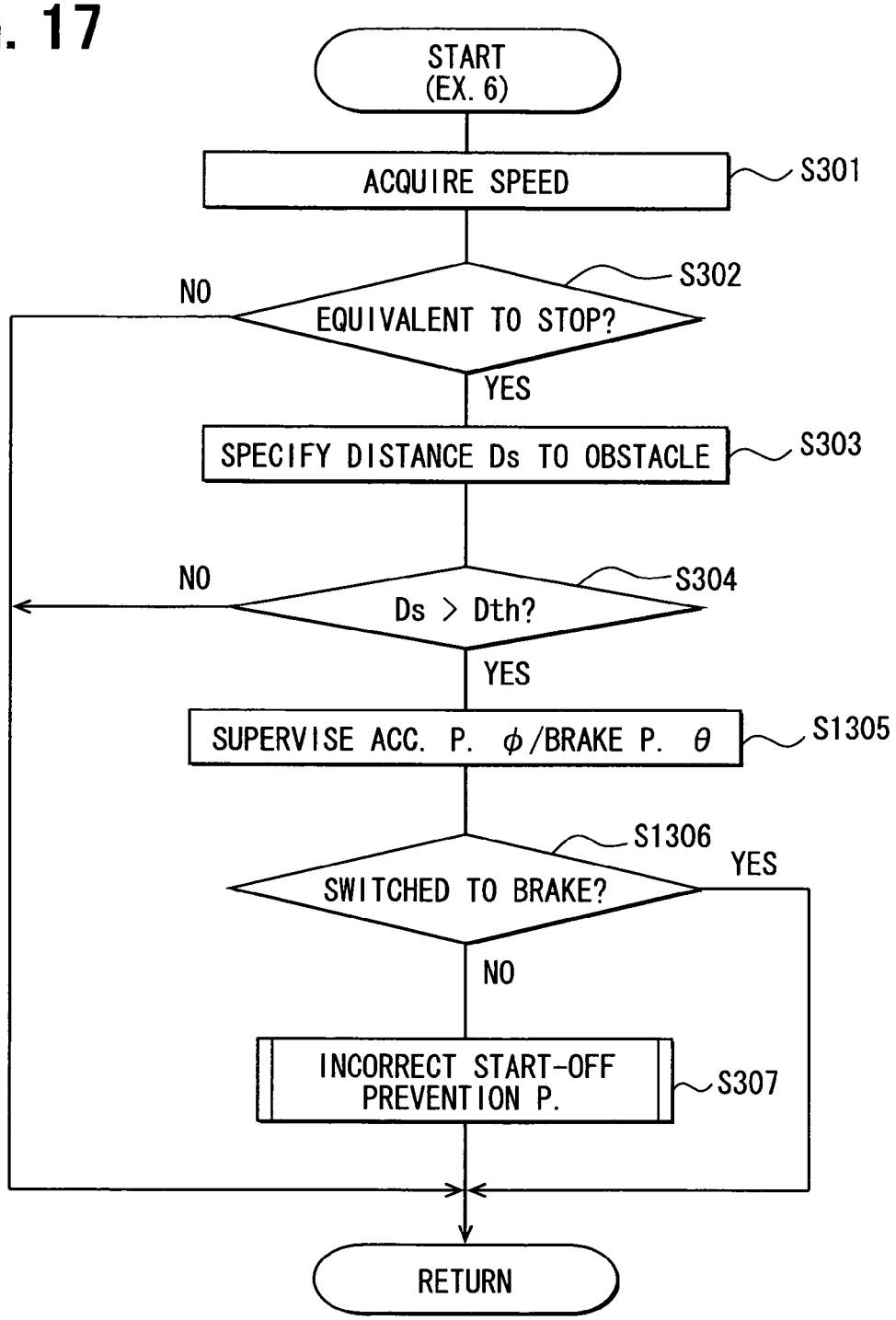
FIG. 17 is a flow chart illustrating a sixth example of a process to perform incorrect starting-off prevention.

FIG. 17 illustrates an example of a process using the forgetting of braking operation as the incorrect starting-off sign driving operation. Differences from the process of FIG. 16 are explained below. In S1305, the brake position θ is also monitored or supervised along with the accelerator position $\phi$. In S1306, by contrasting the outputs of the accelerator sensor and the brake sensor with each other, it is determined whether the accelerator is switched to the brake. When there is no switching in S1306, the processing advances to S307, where the incorrect starting-off prevention process takes place. In addition, when there is switching in S1306, the incorrect starting-off prevention process does not take place.

Figure 18:
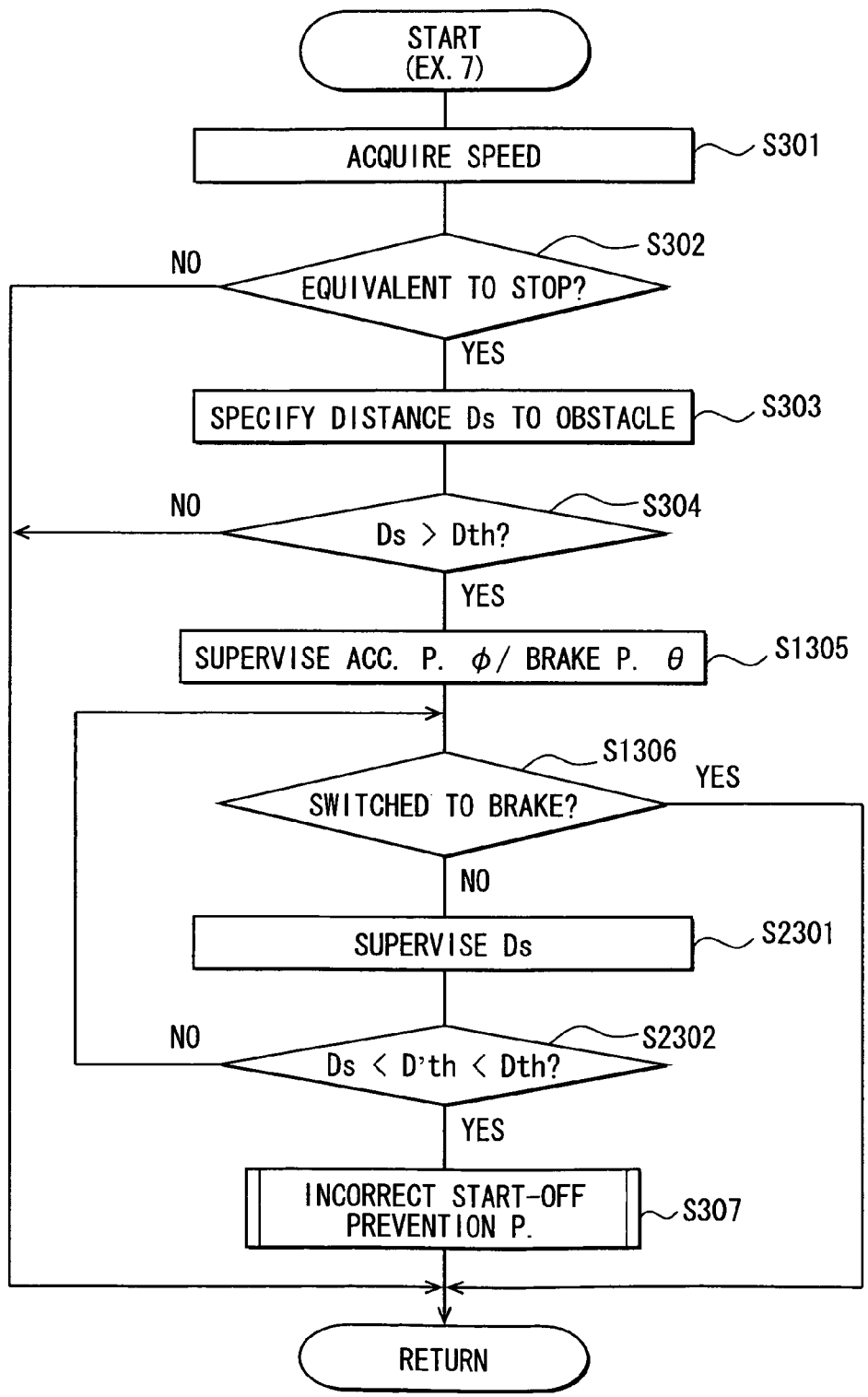
FIG. 18 is a flow chart illustrating a seventh example of a process to perform incorrect starting-off prevention.

In addition, in the process example of FIG. 18, S2301 which monitors the remaining distance Ds to an obstacle is added after S1306 of FIG. 17. Further, when the remaining distance Ds is reduced to less than the limit threshold value Dth' ((for example, 0.5-1 m), which is still smaller than the reference threshold distance Dth, the incorrect starting-off prevention process does not take place. (When the remaining distance Ds is not less than the limit threshold value Dth, the processing returns to S1306, thereby repeatedly performing the subsequent processing.)

Each or any combination of processes, steps, or means explained in the above can be achieved as a software section or unit (e.g., subroutine) and/or a hardware section or unit (e.g., circuit or integrated circuit), including or not including a function of a related device; furthermore, the hardware section or unit can be constructed inside of a microcomputer.

Furthermore, the software section or unit or any combinations of multiple software sections or units can be included in a software program, which can be contained in a computer-readable storage media or can be downloaded and installed in a computer via a communications network.

Aspects of the disclosure described herein are set out in the following clauses.

As an aspect of the disclosure, a vehicle control system comprises: an initial movement state specification means for specifying an initial movement state, in which a speed of a vehicle is zero or minimal and a starting off or accelerating of the vehicle is allowed by stepping on an accelerator pedal; a starting-off direction specification means for specifying a starting-off direction of the vehicle in the initial movement state; a starting-off direction obstacle specification means for specifying an obstacle which exists in the starting-off direction of the vehicle; an incorrect starting-off sign action detection means for detecting an incorrect starting-off sign action, which is predetermined as a sign of an incorrect starting-off towards the obstacle among actions of a driver of the vehicle in the initial movement state; and an incorrect starting-off prevention output means for performing an incorrect starting-off prevention output for preventing the incorrect starting-off in conjunction with detecting the incorrect starting-off sign action.

According to the vehicle control system of the aspect of the disclosure, first, the initial movement state of the vehicle, in which the starting-off or the acceleration is possible, is specified by the stepping-on of the accelerator pedal. A starting-off direction of the vehicle in the initial movement state is specified; an obstacle which exists in the starting-off direction is specified. An incorrect starting-off sign action is detected which the driver indicates in the initial movement state (prior to the actual start-off of the vehicle). When the incorrect starting-off sign action is detected, an incorrect starting-off prevention output is performed. Thereby, the scene having the high probability of an occurrence of the incorrect starting-off can be specified by detecting the starting-off sign action. To that end, an incorrect starting-off prevention control can be executed timely and appropriately.

The incorrect starting-off sign action detection means is configured to detect an incorrect starting-off sign driving operation state as the incorrect starting-off sign action. The driving operation state can be detected as a driving operation state of an operation section being a driving operation target (i.e., the accelerator pedal, the brake pedal, the steering wheel, the shift lever, the direction indicator, etc.) by sensors or the like provided to each operation section. A driving operation arising certainly at the incorrect starting-off is previously specified as a sign driving operation. The incorrect starting-off prevention can be thus ensured.

One of the driving operations certainly taking place at the time of the incorrect starting-off is a stepping-on of the accelerator pedal.

If the accelerator pedal is stepped on, to the excessive degree, to a position at which the acceleration may be generated excessively against the distance to the obstacle, the incorrect starting-off may arise which causes a danger of colliding with the obstacle. In recent years, almost all vehicles have electronic engine control apparatuses, each of which has an accelerator pedal stepping-on position detection means to detect a stepping-on position of the accelerator pedal and an engine output control means which carries out an electronic control of the engine output according to the detected stepping-on position. In such a case, the incorrect starting-off sign action detection means can detect, as the incorrect starting-off sign driving operation state, a state in which the accelerator pedal is stepped on to a position excessively, and the acceleration value is before reaching a level which is expected based on such a position of the accelerator pedal.

That is, in an electronic throttle control apparatus, when a change arises in the stepping-on position of the accelerator pedal, a certain response delay period (for example, 0.01 second-0.5 second) takes place before reaching an expected corresponding acceleration value or engine output. Such a response delay does not cause the user to actually recognize a sense of incongruity. After the accelerator pedal is stepped on, by using the response delay period, the incorrect starting-off prevention output (for example, control output which interrupts or suppresses the engine output) can be made prior to moving to the expected acceleration value, thereby providing an advantage. In other words, the incorrect starting-off prevention is not made based on so called "possibility" of "the accelerator pedal may be stepped on" from the surrounding circumstances. After ascertaining that the stepping-on operation of the accelerator pedal is actually carried out, before reaching the expected acceleration, by using the subsequent response delay period, a countermeasure is performed at the so-called water's edge. The vehicle does not start movement during the above response delay period even if the stepping-on operation is made for the accelerator pedal. Conversely, after the response delay period elapsed, the vehicle certainly starts the movement. Thus, the excessive accelerator pedal stepping-on operation state during the response delay period can be used as an ideal incorrect starting-off sign.

In the vehicle provided with an electronic throttle control apparatus to execute an electronic control of the open-close of the throttle valve according to the detected accelerator pedal stepping-on position, the incorrect starting-off sign action detection means can detect, as an incorrect starting-off sign driving operation state, a state in which the excessive stepping-on of the accelerator pedal is carried out and the throttle valve does not reach the corresponding opening degree. In addition, in a vehicle provided with an electronic combustion injection control apparatus, the state prior to the execution of the combustion injection can be detected as an incorrect starting-off sign driving operation state.

Whether the accelerator pedal is in the excessive stepping-on operation state is determined by whether the stepping-on amount exceeds the predetermined threshold value. Naturally, as the distance to the obstacle is small, a possibility to interfere with the obstacle by stepping-on of the accelerator pedal is increased.

Therefore, the following is desirable. That is, the obstacle detection means is configured to include an obstacle distance detection means for detecting a distance to an obstacle; and the incorrect starting-off sign action detection means is configured to include an excessive stepping-on determination threshold value amendment means for amending a threshold value with respect to a parameter acquired in order to understand a stepping-on amount of the accelerator pedal directly or indirectly. The threshold value is used for determining the accelerator pedal being stepped on to the excessive degree, such that as the distance to the obstacle becomes small, an amount of the stepping on becomes small.

The incorrect starting-off sign action detection means may be configured to detect an accelerator pedal mistaken stepping-on state, in which the accelerator pedal is stepped on mistakenly instead of the brake pedal, as the incorrect starting-off sign action driving operation state. When the vehicle starts movement towards the obstacle's existence direction, the driver may notice the existence of the obstacle after starting-off is performed. In such a case, the driver is going to perform a rapid braking; however, the driver may be confused and lose his/her head or mind may be frightened. Thus, the accelerator pedal might be mistakenly stepped on instead of stepping on the break pedal, thereby actually causing an accident or the like. The driving operation performed when confused is apparently different from that at a usual case. Thus, by regarding such a driving operation as an incorrect starting-off sign driving operation state, a suitable incorrect starting-off prevention can be outputted.

In such cases, while monitoring a stepping-on amount of the accelerator pedal, the incorrect starting-off sign action detection means can be configured to specify a two-step action as the accelerator pedal mistaken stepping-on state in the monitoring profile for the stepping-on amount. The two-step action includes a first zone and a second zone. In the first zone, the stepping-on amount corresponding to a starting-off at a minimal speed is less than a predetermined threshold value. In the second zone, the stepping-on amount increases and exceeds the threshold value from a level in the first zone because of mistakenly stepping on the accelerator pedal although intending to perform a sudden braking. The following is assumed as the result from analyzing in detail the scene in which the accelerator pedal is mistakenly stepped on instead of the brake pedal. That is, without noticing an obstacle existence, the driver at first starts the movement of the vehicle at a minimal speed as usual; thus, the accelerator pedal stepping-on amount is comparatively small. However, once the driver notices the obstacle and mistakenly steps on the accelerator pedal to the utmost limit instead of stepping on the brake pedal, thereby causing a rapid starting-off. Thus, the time variation of the accelerator position exhibits a typical two-step action to transit in a discontinuous manner from the first zone of the minimal speed state (less than threshold value) to the second zone of the suddenly accelerated state due to the incorrect driving operation resulting in the rapid braking. When such actions are detected, the incorrect starting-off prevention is made promptly, thereby preventing the rapid starting-off effectively.

In contrast, although considerably approaching the obstacle, the driver may not notice an obstacle. In such a case, the following states may occur. That is, the brake pedal is not stepped on (for example, the state where the foot remains on the accelerator pedal etc.) or the brake pedal is just contacted by the foot but is not stepped on up to the necessary depth or position.

Thus, the incorrect starting-off sign action detection means may be configured to detect, as an incorrect starting-off sign driving operation state, such a stepping-on insufficient state of the brake pedal or a lapse of memory state of the braking operation. This can allow an incorrect starting-off prevention to be outputted effectively.

Next, the starting-off direction specification means may be a shift position detection means for detecting a shift position of the vehicle. The starting-off direction obstacle specification means may comprise a frontward obstacle detection means for detecting an obstacle existing in front of the vehicle; a backward obstacle detection means for detecting an obstacle existing in back of the vehicle; and a prevention target pattern determination means for determining whether a present determination pattern corresponds to a basic prevention target pattern. The basic prevention target pattern is defined when the shift position is at the frontward movement position and the obstacle existence direction is frontward and when the shift position is at the backward movement position and the obstacle existence direction is backward, among several determination patterns for preventing an incorrect starting-off designated based on a combination of the shift position direction and the obstacle existence direction. The present determination pattern is indicated by a detected state by the shift position and a detected state by each of the frontward obstacle detection means and the backward obstacle detection means. The incorrect starting-off prevention output means may be configured to perform the incorrect starting-off prevention output when it is determined that the present determination pattern corresponds to the basic prevention target pattern. While distinguishing and specifying in which of either front or back an obstacle exists, it is detected whether the shift position of the vehicle is at the frontward position or backward position. Various combinations of the both are previously defined as determination patterns. The basic prevention target pattern is defined when the actual detection results indicate that the obstacle existence direction and the starting-off direction indicated by the shift position accord with each other. When the present determination pattern corresponds to the basic prevention target pattern, an incorrect starting-off prevention is outputted. The obstacle in the direction not according with the starting-off direction of the vehicle can be excluded from the target for the incorrect starting-off prevention. Thereby, the certainty of the incorrect starting-off prevention can be enhanced, and the incorrect starting-off prevention output in the unnecessary scene can be prevented.

In the state where the basic prevention target pattern is effectuated, the obstacle exists in the starting-off direction of the vehicle. If the driver neglects attention, a trouble due to the incorrect starting-off may arise easily. Conventionally, in such a state, the vehicular control is made such that the starting-off of the vehicle is suppressed uniformly. When a driver intentionally starts the movement of the vehicle for entering a garage, performing parallel parking, or moving sideward, the driver needs to manually release the starting-off suppression mode, for example, like Patent document 2. This is not only troublesome for the user, but, after releasing the mode, the defenseless state for the incorrect starting-off takes place. This cannot solve the fundamental problem.

Thus, according to the present aspect, the incorrect starting-off sign action detection means may include a sight line direction detection means for detecting a sight line direction of the driver as an action of the driver. Further, the incorrect starting-off sign action detection means may detect a driver's not-gazing action as the incorrect starting-off sign action. In the driver's not-gazing action, the basic prevention target pattern is effectuated, and the detected sight line direction does not accord with a direction in which the obstacle is confirmed. That is, in the state where the basic prevention target pattern is effectuated, the direction of the obstacle, which the driver should gaze at, and the starting-off direction of the vehicle are narrowed down in advance. When the drivers sight line direction (gaze direction) is detected, it may be determined easily whether the driver is in an inattentive state comparatively accurately. Further, when such an inattentive state is detected as an incorrect starting-off sign action, the incorrect starting-off prevention can be performed more perfectly.

An incorrect starting-off in the state, where the basic prevention target pattern is effectuated, may be classified into two types. The first type results from unskilledness of the driving operation or extremely small margin at entering a parking garage or moving aside even if the obstacle is gazed at. (Hereinafter, it is called the first type incorrect starting-off.) The second type results from the sight line deviation from the obstacle because of the inattention. (Hereinafter, it is called the second type incorrect starting-off.) When the sight line deviation from the obstacle already occurs, as compared with the case where it does not occur, the probability of an occurrence of the incorrect starting-off is increased remarkably. In the scene whose probability of the occurrence of the incorrect starting-off is very high, namely, in cases that the basic prevention target pattern is effectuated and the not-gazed action of the driver is detected as an incorrect starting-off sign action, only when the vehicle is in not stopped state, the incorrect starting-off prevention may be outputted by the incorrect starting-off prevention output means. Thereby, the incorrect starting-off prevention can be performed more perfectly.

The incorrect starting-off prevention output means may be a travel suppression means for suppressing a travel movement of the vehicle. The incorrect starting-off can be thereby prevented more certainly.

In particular, when the vehicle is provided with the above-mentioned electronic engine control apparatus, the travel suppression means may include an engine output restriction means for restricting an engine output according to the stepping-on amount of the accelerator pedal rather than a usual case. Thus, even when the accelerator pedal is stepped on greatly, the engine output becomes smaller than usual and the acceleration becomes dull, thereby suppressing the incorrect starting-off effectively.

In the vehicle provided with the above-mentioned electronic throttle control apparatus, the engine output restriction means may include a throttle valve restriction means to restrict, than usual, the increase in the opening degree of the throttle valve according to the stepping-on of the accelerator pedal. In addition, when the electronic combustion injection control apparatus is provided in the vehicle, a combustion injection restriction means may be included so as to interrupt or suppress combustion injection.

For instance, the following states may be designated. (1) The accelerator pedal is stepped on excessively to thereby exceed the threshold value determined according to the obstacle distance; (2) The brake pedal is not stepped on although the obstacle distance is less than the threshold value; (3) The stepping-on action of the accelerator pedal exhibits the two-step action resulting from the mistake not to step on the brake pedal; and (4) In the state where the basic prevention target pattern is effectuated in which the starting-off direction indicated by the shift position and the obstacle's existence direction accord with each other, the driver's sight line direction does not accord with the direction in which the obstacle should be confirmed. When at least, any one of the above four states is detected as an incorrect starting-off sign action, a process is performed in which the engine output according to the stepping-on amount of the accelerator pedal is restricted rather than a usual case. Thereby, the incorrect starting-off, which may occur after such an incorrect starting-off sign action, can be certainly prevented by restricting the travel movement of the vehicle itself.

In contrast, the incorrect starting-off prevention output means may include a braking assistance means for performing a braking assistance for the vehicle. Even if restricting the engine output, when the speed has already increased greater than a certain level, the key to prevent an interference with an obstacle is how quickly the braking operation is made. Therefore, providing of the above braking assistance means enables an interference with an obstacle accompanying the incorrect starting-off to be prevented or suppressed effectively.

The braking assistance means may include a stepping-on reaction control means for increasing a stepping-on reactive force of the brake pedal, for instance, at the braking assistance rather than the usual case, and a braking pressure control means for increasing an increasing rate of a braking pressure against a stepping-on amount of the brake pedal. While increasing the increasing rate of the braking pressure to the stepping-on amount of the brake pedal at the braking assistance as compared with a usual case, the stepping-on reactive force to the brake pedal is increased as compared with the usual case. In such a case, if the brake pedal stepping-on force is almost equivalent, an almost equivalent braking effect can be acquired by a small stepping-on amount as compared with the case where the braking assistance is not performed. In this regard, however, since the stepping-on reactive force of the brake pedal is larger than usual, the driver senses that the stepping-on amount is insufficient for the sudden braking and tries to further step on the brake pedal. As a result, the braking effect is enhanced and the interference with the obstacle can be prevented or suppressed effectively. Of course, if another process, in which the engine output is restricted according to the stepping-on amount of the accelerator pedal as compared with the usual case, is used together with the above process, the still more effect can be provided.

The incorrect starting-off prevention output means can be an incorrect starting-off danger report means for performing a danger report output of the incorrect starting-off prevention to the driver, who indicates the incorrect starting-off sign action, using at least one of a sound wave, a light, a vibration, and a smell.

In detail, a vibration generation apparatus may be comprised as being attached to at least one of the driver seat and the accelerator pedal. Such a danger report output can urge the driver to spontaneously perform the incorrect starting-off prevention operation. Furthermore, when the driver receives a danger report output in the state of forgetting incorrect starting-off prevention operation, the driver tries to operate incorrect starting-off prevention operation in a series of separating the foot from the accelerator pedal→stepping on the brake pedal. In such a case, the following operation may be performed. A: Stepping on the brake pedal. B: Stepping on the accelerator pedal mistakenly instead of stepping on the brake pedal. In order to respond to the latter, another process may be in parallel performed in which the engine output according to the stepping-on amount of the accelerator pedal is restricted as compared with a usual case, thereby providing more effect. Further, also in order to respond to the former, another process may be in parallel performed in which the stepping-on reactive force of the brake pedal is increased than usual, and the increasing rate of the braking pressure against the stepping-on amount of the brake pedal is increased than usual, thereby providing more effect.

It will be obvious to those skilled in the art that various changes may be made in the above-described embodiments of the present invention. However, the scope of the present invention should be determined by the following claims.

What is claimed:

1. A vehicle control system comprising:
an initial movement state specification section that specifies an initial movement state, in which a speed of a vehicle is zero or minimal and a starting off or accelerating of the vehicle is allowed by stepping on an accelerator pedal;
a starting-off direction specification section that specifies a starting-off direction of the vehicle in the initial movement state;
a starting-off direction obstacle specification section that specifies an obstacle which exists in the starting-off direction of the vehicle;
an incorrect starting-off sign action detection section that detects an incorrect starting-off sign action, which is predetermined as a sign of an incorrect starting-off towards the obstacle among actions of a driver of the vehicle in the initial movement state,
the incorrect starting-off sign action detection section detecting an incorrect starting-off sign driving operation state as the incorrect starting-off sign action,
the incorrect starting-off sign action detection section detecting, as the incorrect starting-off sign action driving operation state, an accelerator pedal mistaken stepping-on state, in which, instead of the brake pedal, the accelerator pedal is mistakenly stepped on; and
an incorrect starting-off prevention output section that performs an incorrect starting-off prevention output for preventing the incorrect starting-off in conjunction with the incorrect starting-off sign action being detected,
wherein
while monitoring a stepping-on amount of the accelerator pedal, the incorrect starting-off sign action detection section specifies a two-step action as the accelerator pedal mistaken stepping-on state,
the two-step action including a first zone and a second zone,
the first zone in which the stepping-on amount is less than a predetermined threshold value in response to a starting-off at a minimal speed,
the second zone in which the stepping-on amount is rapidly increasing from a level of the first zone and exceeding the predetermined threshold value because of mistakenly stepping on the accelerator pedal although intending to perform a sudden braking.

2. The vehicle control system according to claim 1, wherein
the incorrect starting-off sign action detection section detects, as the incorrect starting-off sign driving operation state, a stepping-on insufficient state or a lapse of memory state of the brake pedal.

3. The vehicle control system according to claim 1, wherein:
the starting-off direction specification section is a shift position detection section that detects a shift position of the vehicle;
the starting-off direction obstacle specification section comprises
a frontward obstacle detection section that detects an obstacle existing in front of the vehicle,
a backward obstacle detection section that detects an obstacle existing in back of the vehicle, and
a prevention target pattern determination section that determines whether a present determination pattern corresponds to a basic prevention target pattern,
the basic prevention target pattern being defined when the shift position is at a frontward movement position and the obstacle existence direction is frontward and when the shift position is at a backward movement position and the obstacle existence direction is backward, among several determination patterns for preventing an incorrect starting-off designated based on a combination of the shift position and the obstacle existence direction,
the present determination pattern being indicated by a detected state by the shift position and a detected state by each of the frontward obstacle detection section and the backward obstacle detection section; and
the incorrect starting-off prevention output section performs the incorrect starting-off prevention output when it is determined that the present determination pattern corresponds to the basic prevention target pattern.

4. The vehicle control system according to claim 3, wherein
the incorrect starting-off sign action detection section includes a sight line direction detection section that detects a sight line direction of the driver as an action of the driver; and
the incorrect starting-off sign action detection section detects, when the basic prevention target pattern is effectuated, a driver's not-gazing action as the incorrect starting-off sign action, the driver's not-gazing action in which the detected sight line direction does not accord with a direction in which the obstacle is confirmed.

5. The vehicle control system according to claim 4, wherein
the incorrect starting-off prevention output section performs the incorrect starting-off prevention output in cases that the basic prevention target pattern is effectuated, the not-gazing action is detected as the incorrect starting-off sign action, and
the vehicle is in a state of not stopping.

6. The vehicle control system according to claim 1, wherein
the incorrect starting-off prevention output section includes a travel suppression section that suppresses a travel movement of the vehicle.

7. The vehicle control system according to claim 6, wherein
the vehicle includes an electronic engine control apparatus comprising an accelerator pedal stepping-on position detection section that detects a stepping-on position of the accelerator pedal, and an engine output control section that performs an electronic control of an engine output based on the detected stepping-on position; and the travel suppression section includes an engine output restriction section that restricts, as compared with a usual case, an engine output according to the stepping-on amount of the accelerator pedal.

8. The vehicle control system according to claim 1, wherein the incorrect starting-off prevention output section includes a braking assistance section that performs a braking assistance for the vehicle.

9. The vehicle control system according to claim 8, wherein the braking assistance section includes a stepping-on reaction control section that increases a stepping-on reactive force of the brake pedal at the braking assistance rather than the usual case, and a braking pressure control section that increases an increasing rate of a braking pressure against a stepping-on amount of the brake pedal.

10. The vehicle control system according to claim 1, wherein the incorrect starting-off prevention output section includes an incorrect starting-off danger report section that performs a danger report output of the incorrect starting-off prevention to the driver who indicates the incorrect starting-off sign action using at least one of a sound wave, a light, a vibration, and a smell.

11. The vehicle control system according to claim 10, wherein the incorrect starting-off danger report section includes a vibration generation apparatus attached to at least one of a driver seat and the accelerator pedal.

* * * * *